(12) United States Patent
Ng et al.

(10) Patent No.: US 10,148,337 B2
(45) Date of Patent: Dec. 4, 2018

(54) BEAM MANAGEMENT OF DOWNLINK DATA CHANNEL AND DOWNLINK CONTROL CHANNEL FOR 5G NEXT RADIO SYSTEMS

(71) Applicant: Samsung Electronics Co., Ltd., Gyeonggi-do (KR)

(72) Inventors: Boon Loong Ng, Plano, TX (US); Vikram Chandrasekhar, Mountain View, CA (US); Young-Han Nam, Plano, TX (US); Jaewon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/877,185

(22) Filed: Jan. 22, 2018

(65) Prior Publication Data

US 2018/0219606 A1 Aug. 2, 2018

Related U.S. Application Data

(60) Provisional application No. 62/453,312, filed on Feb. 1, 2017, provisional application No. 62/454,478, filed (Continued)

(51) Int. Cl.
*H04B 7/08* (2006.01)
*H04B 7/06* (2006.01)
*H04W 72/04* (2009.01)
*H04L 25/02* (2006.01)

(52) U.S. Cl.
CPC ............ *H04B 7/088* (2013.01); *H04B 7/0617* (2013.01); *H04L 25/0204* (2013.01); *H04W 72/042* (2013.01); *H04W 72/0453* (2013.01)

(58) Field of Classification Search
CPC .. H04B 7/0408; H04B 7/0617; H04B 7/0413; H04B 7/0695; H04B 7/088; H04W 16/28; H04W 72/046
See application file for complete search history.

(56) References Cited

U.S. PATENT DOCUMENTS 9,537,631 B2  1/2017  Park et al.
2014/0036806 A1  2/2014  Chen et al.
(Continued)

FOREIGN PATENT DOCUMENTS

EP  2728787 A2  5/2014
WO  2016-067318 A1  5/2016

OTHER PUBLICATIONS

"LTE; Evolved Universal Terrestrial Radio Access (E-UTRA); Physical Channels and Modulation (3GPP TS 36.211 Version 13.0.0 Release 13)," ETSI TS 136.211, V13.0.0, Jan. 2016, 143 pages.
(Continued)

*Primary Examiner* — Nam Huynh

(57) ABSTRACT

A method of a user equipment (UE) for beam management in a wireless communication system is provided. The method comprises receiving, from a base station (BS), a radio resource control (RRC) signaling and a medium access control channel element (MAC CE) signaling including a beam indicator over a downlink channel for the beam management, identifying the beam indicator based on the RRC signaling and the MAC CE signaling, and determining the beam indicator for a physical downlink control channel (PDCCH), a common physical downlink shared channel (PDSCH), and a fallback unicast PDSCH.

20 Claims, 29 Drawing Sheets

Related U.S. Application Data on Feb. 3, 2017, provisional application No. 62/474,385, filed on Mar. 21, 2017, provisional application No. 62/511,879, filed on May 26, 2017, provisional application No. 62/520,927, filed on Jun. 16, 2017, provisional application No. 62/540,796, filed on Aug. 3, 2017, provisional application No. 62/544,312, filed on Aug. 11, 2017, provisional application No. 62/547,494, filed on Aug. 18, 2017.

(56) References Cited

U.S. PATENT DOCUMENTS

| | | | |
|---|---|---|---|
| 2014/0120926 A1 | 5/2014 | Shin et al. | |
| 2017/0346545 A1* | 11/2017 | Islam | H04B 7/0814 |
| 2018/0042000 A1* | 2/2018 | Zhang | H04W 72/046 |
| 2018/0131492 A1* | 5/2018 | Wilson | H04L 5/0053 |

OTHER PUBLICATIONS

3rd Generation Partnership Project; Technical Specification Group Radio Access Network; Evolved Universal Terrestrial Radio Access (E-UTRA); Multiplexing and Channel Coding (Release 13), 3GPP TS 36.212, V13.0.0.0, Dec. 2015, 121 pages.

"LTE; Evolved Universal Terrestrial Radio Access (E-UTRA); Physical Layer Procedures (3GPP TS 36.213 Version 13.0.0 Release 13)," ETSI TS 136.213, V13.0.0, May 2016, 328 pages.

"LTE; Evolved Universal Terrestrial Radio Access (E-UTRA); Medium Access Control (MAC) Protocol Specification (3GPP TS 36.321 Version 13.0.0 Release 13)," ETSI TS 136.321, V13.0.0, Feb. 2016, 84 pages.

"LTE; Evolved Universal Terrestrial Radio Access (E-UTRA); Radio Resource Control (RRC) Protocol Specification (3GPP TS 36.331 Version 13.0.0 Release 13)," ETSI TS 136.331, V13.0.0, Jan. 2016, 670 pages.

"3rd Generation Partnership Project; Technical Specification Group Services and System Aspects; Feasibility Study on New Services and Markets Technology Enablers; Stage 1 (Release 14)," 3GPP TR 22.891, V14.2.0, Sep. 2016, 95 pages.

ISA/KR, "International Search Report and Written Opinion of the International Searching Authority," International Application No. PCT/KR2018/001402, dated Jun. 27, 2018, 12 pages.

* cited by examiner (a)

(b)

BEAM MANAGEMENT OF DOWNLINK DATA CHANNEL AND DOWNLINK CONTROL CHANNEL FOR 5G NEXT RADIO SYSTEMS

CROSS-REFERENCE TO RELATED APPLICATIONS AND CLAIM OF PRIORITY

The present application claims priority to U.S. Provisional Patent Application Ser. No. 62/453,312, filed on Feb. 1, 2017; U.S. Provisional Patent Application Ser. No. 62/454,478, filed on Feb. 3, 2017; U.S. Provisional Patent Application Ser. No. 62/474,385, filed on Mar. 21, 2017; U.S. Provisional Patent Application Ser. No. 62/511,879, filed on May 26, 2017; U.S. Provisional Patent Application Ser. No. 62/520,927, filed on Jun. 16, 2017; U.S. Provisional Patent Application Ser. No. 62/540,796, filed on Aug. 3, 2017; U.S. Provisional Patent Application Ser. No. 62/544,312, filed on Aug. 11, 2017; and U.S. Provisional Patent Application Ser. No. 62/547,494, filed on Aug. 18, 2017. The content of the above-identified patent document is incorporated herein by reference.

TECHNICAL FIELD

The present application relates generally to beam management in wireless communication systems. More specifically, this disclosure relates to beam management of downlink data and control channel for 5G next radio.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for beam management in a wireless communication system is provided. The UE comprises a transceiver configured to receive, from a base station (BS), a radio resource control (RRC) signaling and a medium access control channel element (MAC CE) signaling including a beam indicator over a downlink channel for the beam management, and a processor configured to identify the beam indicator based on the RRC signaling and the MAC CE signaling and determine the beam indicator for a physical downlink control channel (PDCCH), a common physical downlink shared channel (PDSCH), and a fallback unicast PDSCH.

In another embodiment, a base station (BS) for beam management in a wireless communication system is provided. The BS comprises a processor configured to determine a beam indicator for a physical downlink control channel (PDCCH), a common physical downlink shared channel (PDSCH), and a fallback unicast PDSCH and configure the beam indicator based on a radio resource control (RRC) signaling and a medium access control channel element (MAC CE) signaling. The BS further comprises a transceiver configured to transmit, to a user equipment (UE), the RRC signaling and the MAC CE signaling including the beam indicator over a downlink channel for the beam management.

In yet another embodiment, a method of a user equipment (UE) for beam management in a wireless communication system is provided. The method comprises receiving, from a base station (BS), a radio resource control (RRC) signaling and a medium access control channel element (MAC CE) signaling including a beam indicator over a downlink channel for the beam management, identifying the beam indicator based on the RRC signaling and the MAC CE signaling, and determining the beam indicator for a physical downlink control channel (PDCCH), a common physical downlink shared channel (PDSCH), and a fallback unicast PDSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification;" 3GPP TS 36.331 v13.0.0, "E-UTRA, Radio Resource Control (RRC) Protocol Specification;" and 3GPP TR 22.891 v14.2.0, "Feasibility Study on New Services and Markets Technology Enablers."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
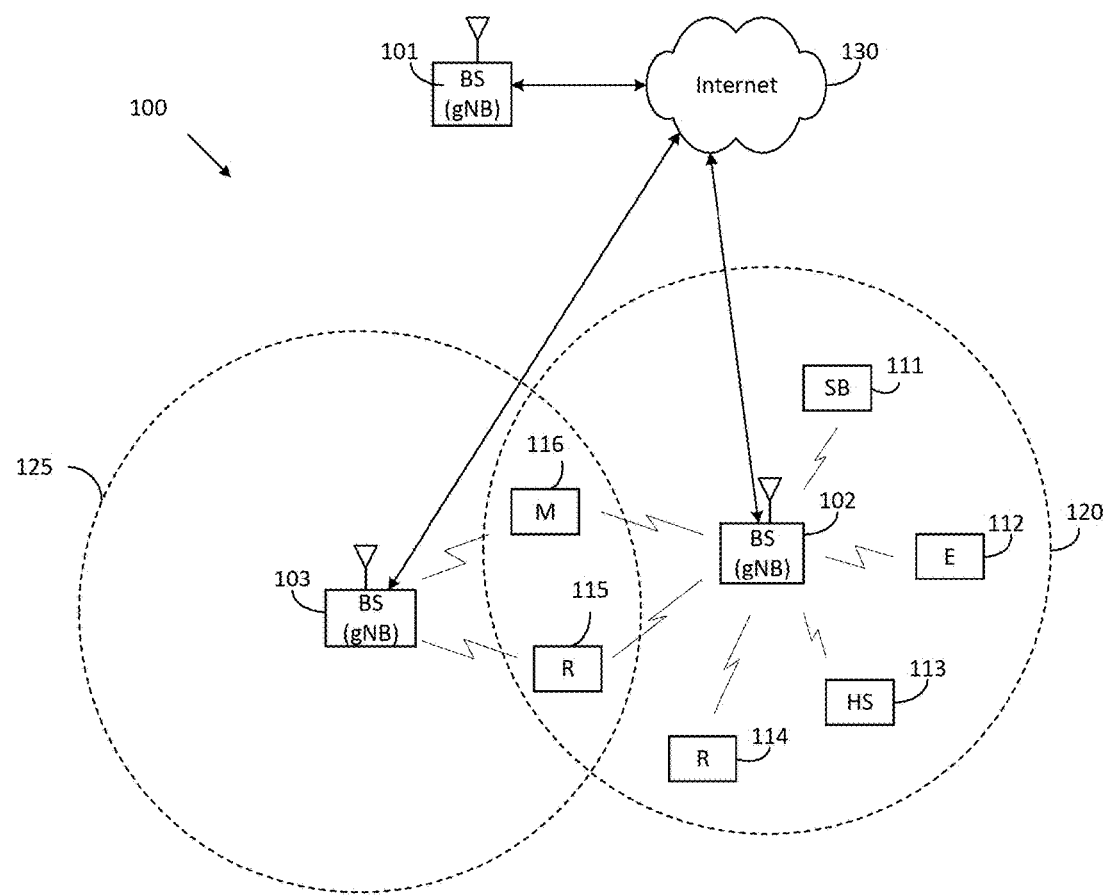
FIG. 1 illustrates an example wireless network according to embodiments of the present disclosure.
Figure 2:
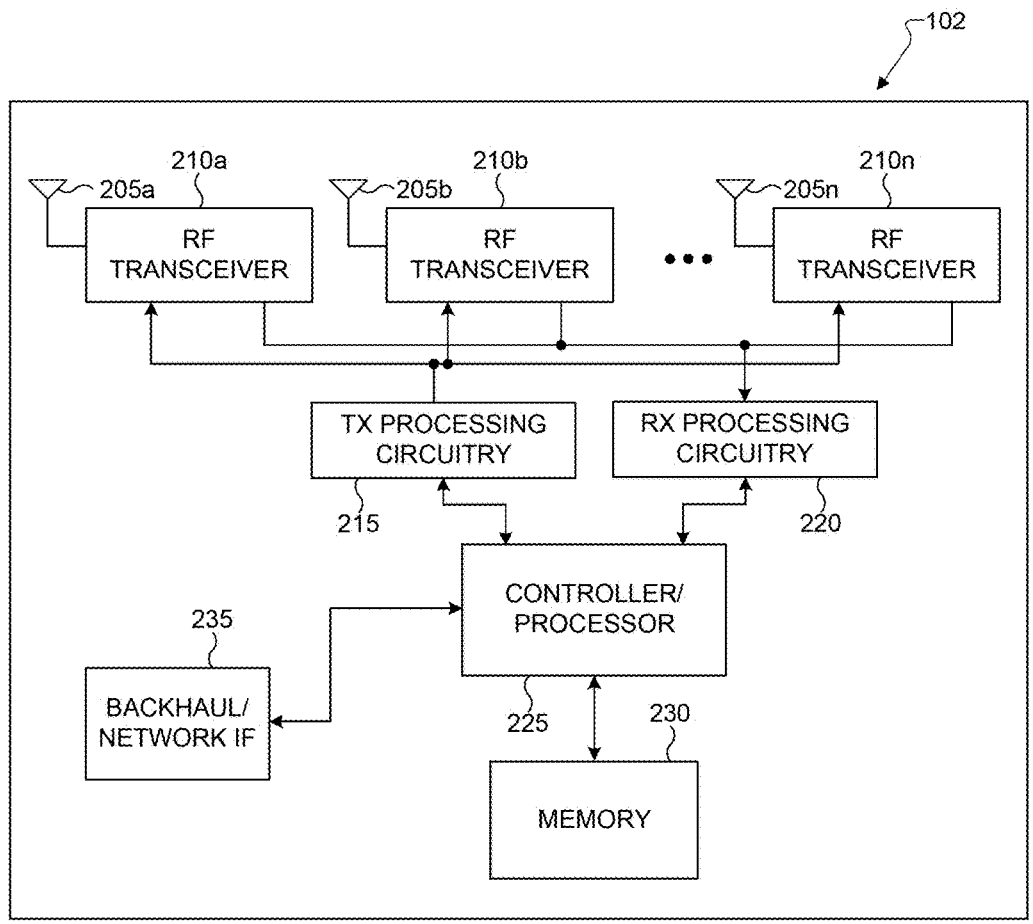
FIG. 2 illustrates an example gNB according to embodiments of the present disclosure.
Figure 3:
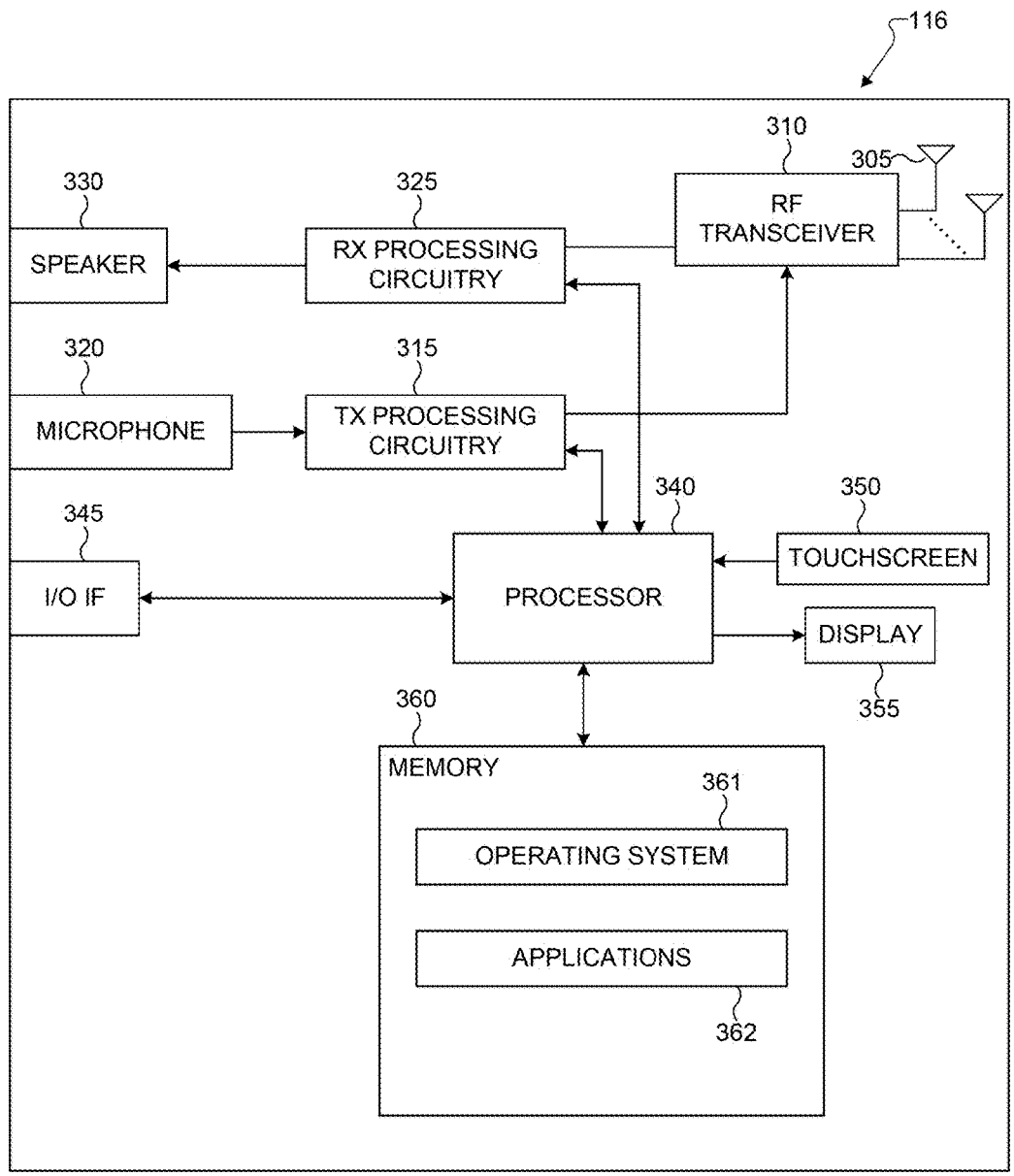
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient beam management in an advanced wireless communication system. In certain embodiments, and one or more of the gNBs 101-103 includes circuitry, programming, or a combination thereof, for efficient beam management in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
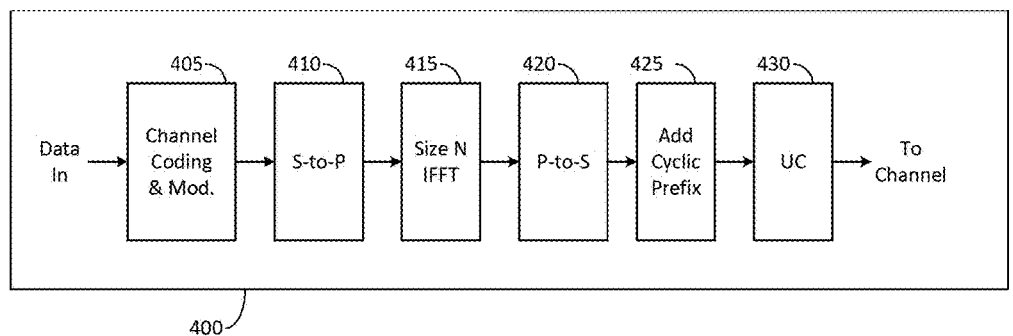
FIG. 4A illustrates an example high-level diagram of an orthogonal frequency division multiple access transmit path according to embodiments of the present disclosure.
Figure 4B:
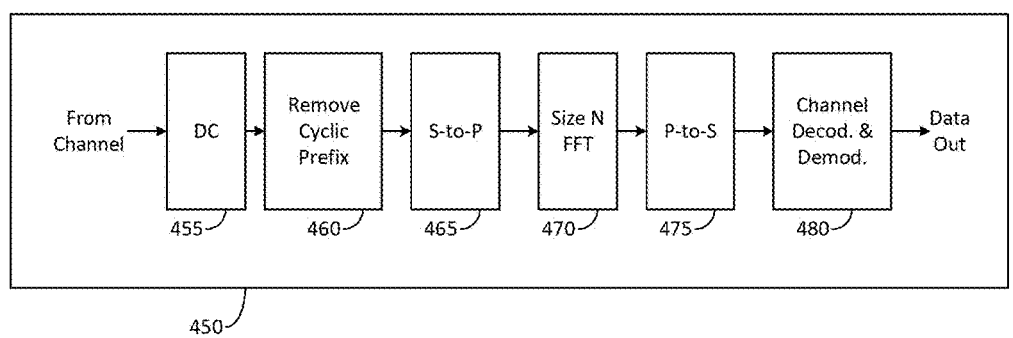
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE's data transmission/reception.

Figure 5:
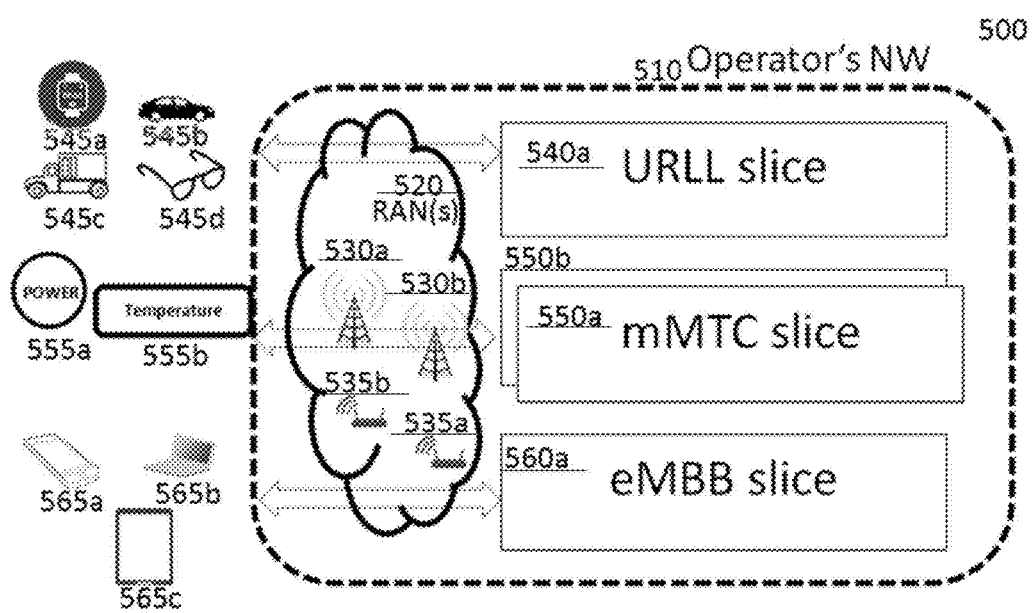
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of gNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., gNBs 530a and 530b, small cell base stations (femto/pico gNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
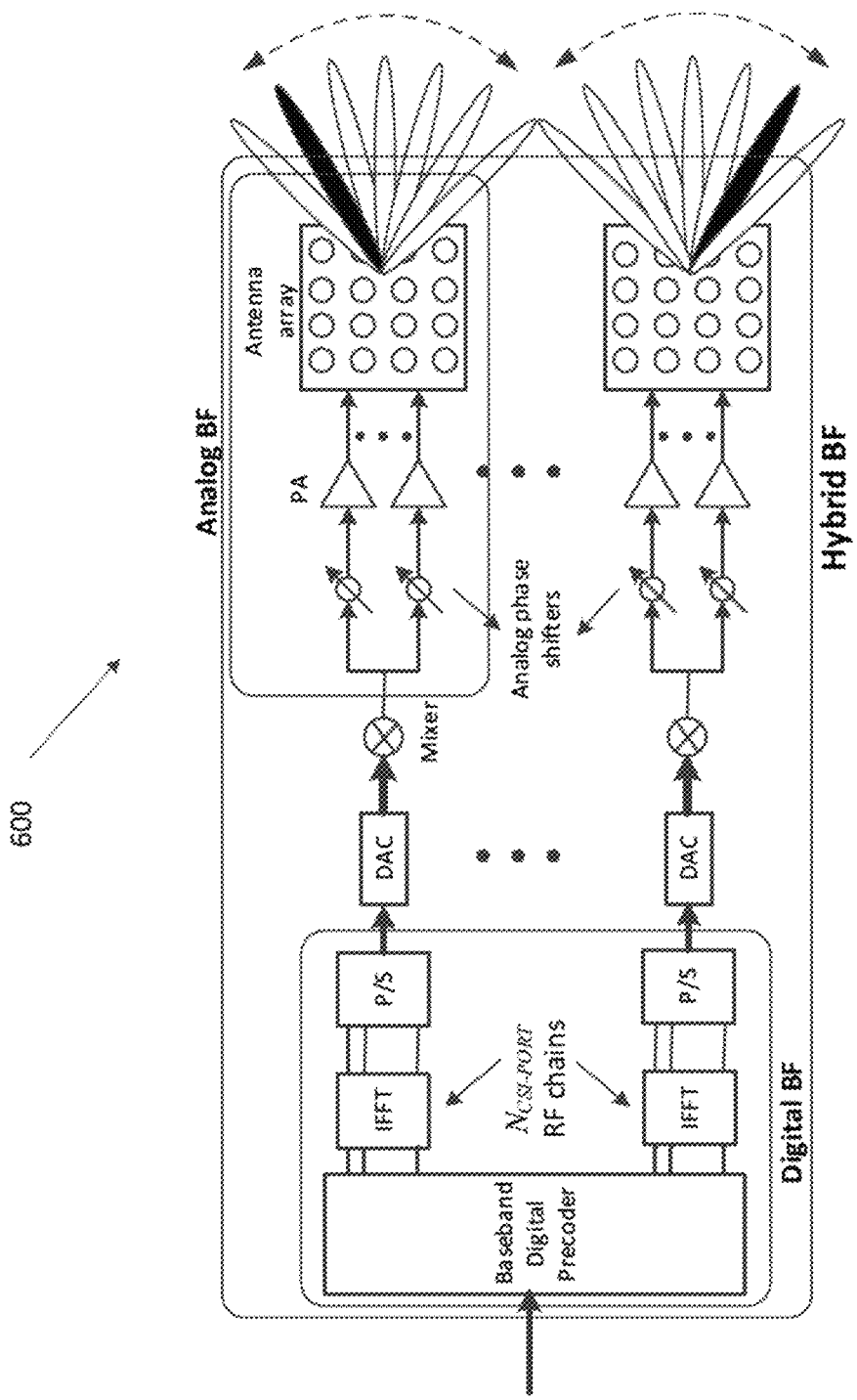
FIG. 6 illustrates an example hybrid beam forming structure according to embodiments of the present disclosure.

FIG. 6 illustrates an example hybrid beam forming structure 600 according to embodiments of the present disclosure. An embodiment of the hybrid beam forming structure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

The present disclosure considers the beam management procedure for the physical downlink shared data channel (PDSCH) and the physical downlink control channel (PDCCH) of the next generation cellular systems.

In some embodiments, two terminologies, "RS for mobility" and "beam reference signals (BRS)" are used interchangeably. In some embodiments of this disclosure, CSI refers to at least one of CQI, PMI, RI, RSRP and a CSI-related resource index (e.g., beam index, CSI-RS resource index). In some embodiments of this disclosure, BSI refers to at least one of: (1) beam index that can be derived from CSI-RS port index, beam resource index/time unit index and B-CSI-RS resource index; or (2) RSRP and/or RSRQ of the reported beam. In some embodiments of this disclosure, it is assumed that UE is configured with reference numerology (comprising OFDM symbol length and subcarrier spacing) at least for PDSCH reception. In some embodiments, the two terminologies, "beam resource" and "time unit" are used interchangeably.

In the present disclosure, a QCL resource may refer to a beam, an antenna port (across all the configured time units), a group of antenna ports corresponding to an RS resource, a CSI-RS resource, or a combination of an antenna port and a time unit of an RS resource. In the present disclosure, an RS resource may refer to a CSI-RS resource, BRS (multi-beam mobility RS, can be cell-specifically configured, may correspond to PSS, SSS, PBCH DMRS, DMRS, CSI-RS or a newly designed RS), a set of DMRS ports, etc. In the present disclosure, an RS setting may refer to a set of RS resources. In the present disclosure, a time unit may correspond to a block of (consecutive) one or more OFDM symbols according to a configured numerology, on which UE can assume that a same QCL parameter is applicable to each antenna port (and/or in which the port-coherency holds).

In the present disclosure, a Tx beam (ID) may refer to a QCL resource of an RS resource, wherein the RS resource can be BRS or CSI-RS. Tx beams of an RS resource or an RS setting can be indexed with unique IDs, referred to Tx beam IDs. For example, if N Tx beams are available in an RS resource or an RS setting, N unique IDs can be allocated to these N individual Tx beams. In the present disclosure, an Rx beam ID refers to an index that can be commonly understood by UE and gNB, for UE's Rx beamforming operation. A UE can be equipped with a single or multiple digital Rx chains. When the UE is equipped with a single Rx chain, a first Rx beam ID corresponds to a first Rx beam that is steered to a first angle; a second Rx beam ID corresponds to a second Rx beam that is steered to a second angle; and so on. When the UE is equipped with N digital Rx chains, the first Rx beam ID corresponds to a first set of N Rx beams that are steered to a first set of N angles; the second Rx beam ID corresponds to a second set of N Rx beams that are steered to a second set of N angles; and so on. Here, N is a positive integer. As an Rx beam ID may be associated with multiple Rx beams (especially in multiple digital chain case), an Rx beam ID may alternatively referred to an Rx mode.

In the present disclosure, kc-beam, Rx mode and Rx-beam related QCL parameters are used interchangeably, and refer to average AOA, ASD or antenna correlations. When an Rx beam of a first QCL resource can be inferred by that of a second QCL resource, the first and the second QCL resources are said QCL'ed in Rx-beam/Rx mode. In the present disclosure, a set of QCL parameters refers to a combination of Rx-beam related parameters (average angle of arrival, arrival angle spread, Rx antenna correlation, etc.), delay and timing related parameters (Rx timing, delay spread, average delay), Doppler related parameters (average Doppler, Doppler spread), etc.

When considering the beam management procedure for common PDSCH, it should be taken into account that such PDSCH need to be received by the UE during the initial access procedure, as well as during idle mode. As such, there is a need for a beam management procedure that does not require active management by the network based on UE feedback. This would also avoid frequent idle-RRC connected state transition just for the purpose of beam management. It follows that the RS used for beam measurement by the UE may be based on a cell-specific RS, which can be one or more of NR-SSS, mobility RS (MRS), BRS or cell-specific CSI-RS. Other types of cell-specific RS are also possible. Based on the measurement of a set of cell-specific RSs, the UE can determine the best or preferred Tx beam and Rx beam (if multiple Rx beams can be employed by the UE) to receive the common PDSCH.

Figure 7:
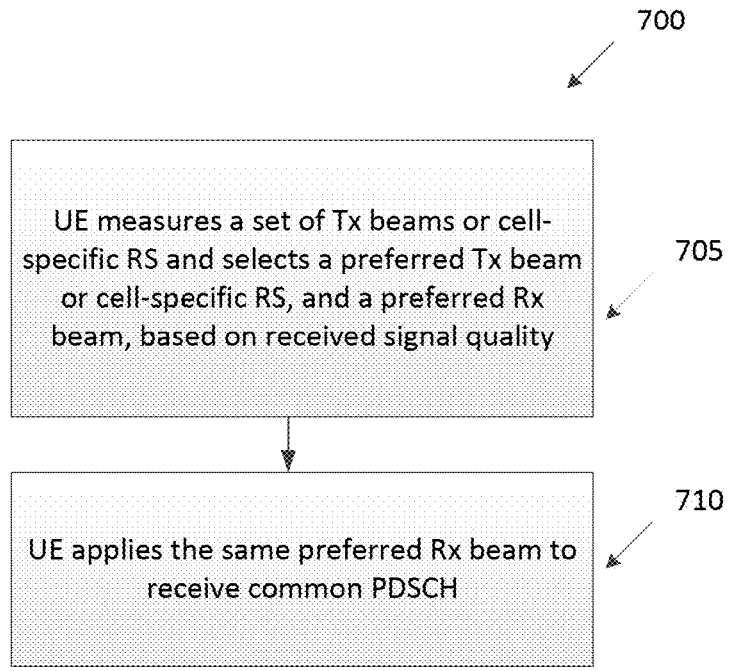
FIG. 7 illustrates an example UE procedure for determining the Rx beam to receive common PDSCH according to embodiments of the present disclosure.

FIG. 7 illustrates an example UE procedure 700 for determining the Rx beam to receive common PDSCH according to embodiments of the present disclosure. An embodiment of the UE procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

Figure 8:
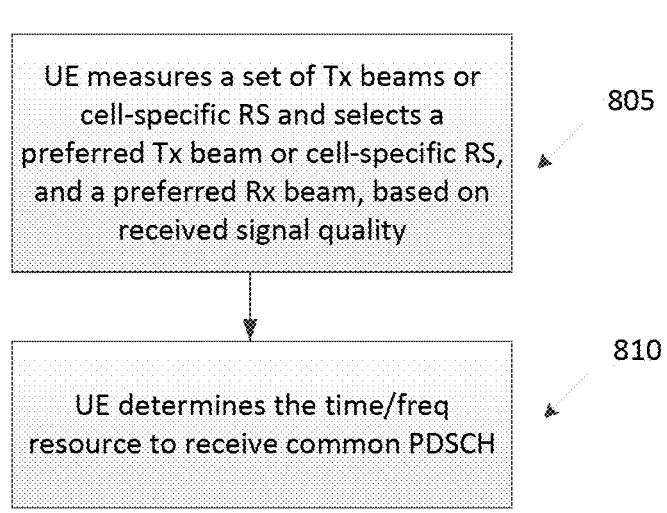
FIG. 8 illustrates an example UE procedure for determining the time/frequency resource to receive common PDSCH according to embodiments of the present disclosure.

FIG. 8 illustrates an example UE procedure 800 for determining the time/frequency resource to receive common PDSCH according to embodiments of the present disclosure. An embodiment of the UE procedure 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

The time-frequency resource for receiving common PDSCH can depend on the best/preferred Tx beam or cell-specific RS determined by the UE. The mapping of the Tx beam to the time-frequency resource can be predefined in the standards specifications, or informed by the network in a broadcast message such as in a PBCH.

In one embodiment, a time and/or frequency window wherein the network can schedule the common PDSCH and the UE may search for the common PDSCH, is determined as a function of the Tx beam id or time/frequency location of the Tx beam. For example, the time window can be a periodic time window, where the periodicity can be an integer multiple of the system frame number (SFN), and the start of the time window can be an offset in terms of slot unit with respect to the first slot of the SFN, and the duration of the time window can also be defined in terms of the number of slot units. The periodicity, the starting slot offset and the duration of the window can be predefined, or signaled by the network in a broadcast message (e.g. a PBCH or a common DCI). This example is illustrated in FIG. 9.

Figure 9:
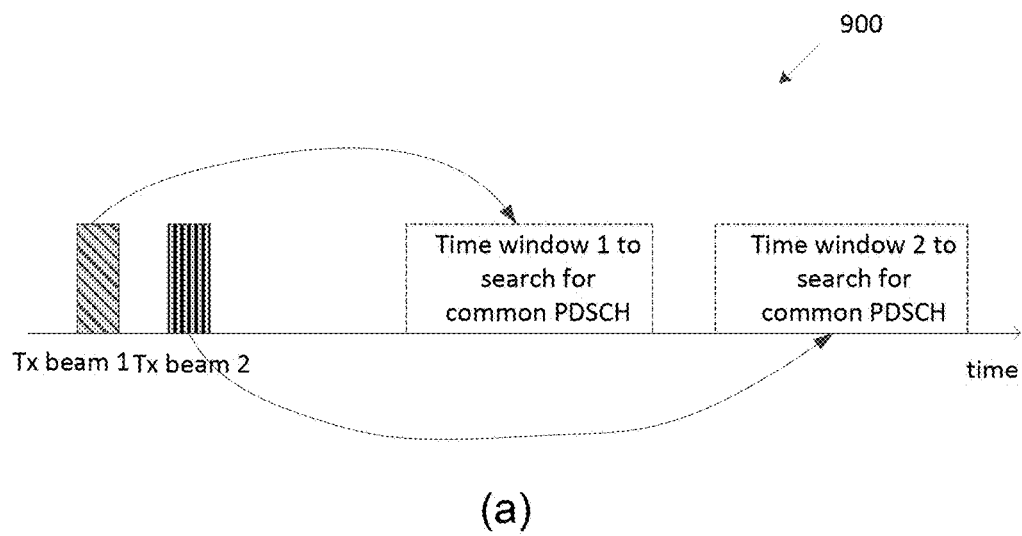
FIG. 9 illustrates an example determination of time window to search for common PDSCH given the preferred Tx beam according to embodiments of the present disclosure.
Figure 9:
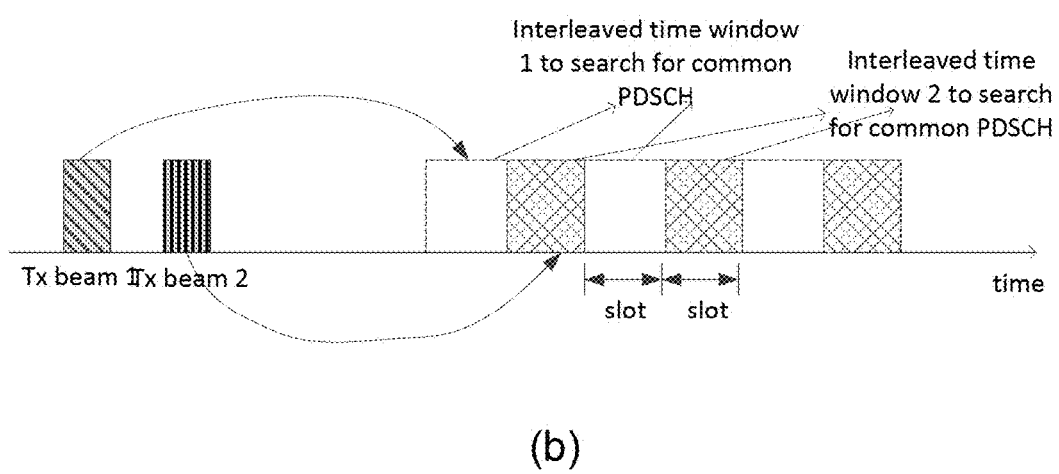

FIG. 9 illustrates an example determination of time window 900 to search for common PDSCH given the preferred Tx beam according to embodiments of the present disclosure. An embodiment of the determination of time window 900 shown in FIG. 9 is for illustration only. One or more of the components illustrated in FIG. 9(a) can be implemented in specialized circuitry configured to perform the noted functions or one or more of the components can be implemented by one or more processors executing instructions to perform the noted functions. Other embodiments are used without departing from the scope of the present disclosure.

In one example, the time and/or frequency windows for the different beams can be interleaved in time and/or frequency domain. This can minimize the average delay for the UE to receive the common PDSCH messages. This example is illustrated in FIG. 9(b). In this case, the configuration can include the sub-window duration and the interleaving factor (which determines the number of sub-windows). It is noted that if the common PDSCH is scheduled by a DCI in a PDCCH, the time-frequency window can define the window for the UE to monitor the UE-common PDCCH, the common PDSCH resource is then determined by the UE-common PDCCH content.

When the UE determines that the best/preferred Tx beam or cell-specific RS has changed from a first Tx beam to a second Tx beam for receiving common PDSCH, the UE would also change the time/frequency resource for receiving the common PDSCH from that corresponding to the first Tx beam to that corresponding to the second Tx beam. If necessary, the Rx beam employed by the UE to receive the common PDSCH also changes from that corresponding to the first Tx beam to that corresponding to the second Tx beam, based on the best received signal quality (e.g. RSRP, SINR or the like).

In certain cases, it can be beneficial for the UE to inform the network the UE's preferred Tx beam has changed. The knowledge of UE's preferred Tx beam at the TRP allows the network to schedule the UE to the appropriate UE-group common PDSCH in the case there can be multiple UE-group common PDSCHs, where each UE-group common PDSCH targets different set of UEs. If the UE-group common PDSCH can be scheduled to idle mode UEs, there is a need to specify a procedure that can be applied to idle mode.

Figure 10:
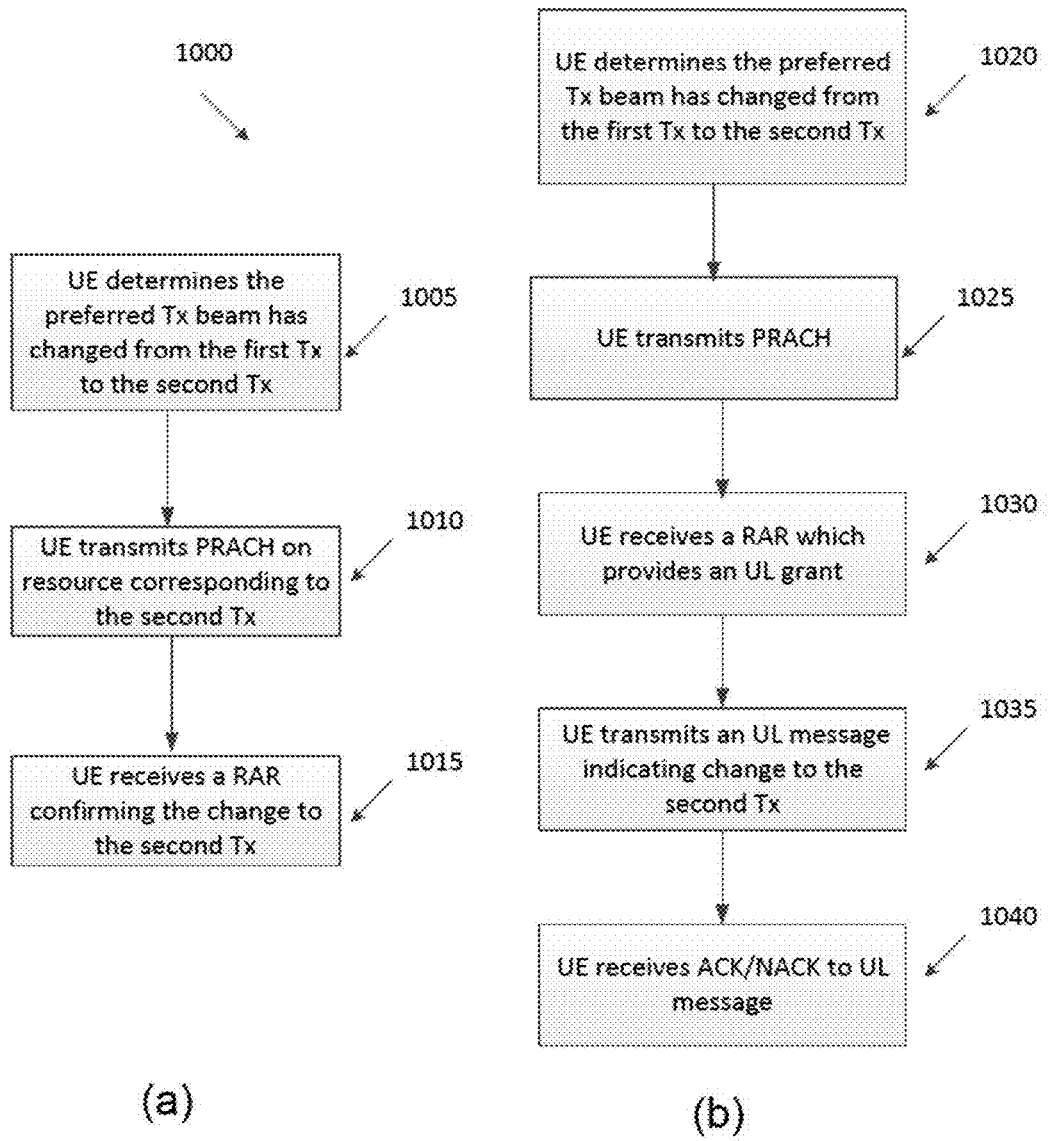
FIG. 10 illustrates an example random access procedure to inform the network UE's change in preferred Tx beam according to embodiments of the present disclosure.

FIG. 10 illustrates an example random access procedure 1000 to inform the network UE's change in preferred Tx beam according to embodiments of the present disclosure. An embodiment of the random access procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In one embodiment, the random access procedure can be used to indicate the change in the preferred Tx beam for the UE. Two example procedures are illustrated in FIG. 10. The procedure illustrated in FIG. 10(a) assumes the PRACH resource location implicitly indicates the identity of the preferred Tx beam. The PRACH resource and mapping to Tx beam can be predefined or can be configured by the higher layer. The procedure illustrated in FIG. 10(b) makes no assumption of mapping between the PRACH resource and the Tx beam identity. The UE needs to include the indication of its preferred Tx beam in an UL data transmission after reception of the RAR. If the UE was in idle mode before the random access procedure, the UE can remain in the idle mode.

The aforementioned procedures can be extended to the deployment scenarios where there can be multiple TRPs transmitting multiple common PDSCHs that need to be received by the UE, or there can be multiple Tx beams from a single TRP, transmitting multiple common PDSCHs that need to be received by the UE. In these scenarios, the UE would maintain at least one best/preferred Tx beam from each TRP or each beam of a TRP, and determine the appropriate Rx beam and common PDSCH resources to receive for each TRP or each beam of a TRP.

For the unicast PDSCH, it would be necessary for the UE to indicate to the network the best/preferred Tx beam to receive the PDSCH, as such UE feedback would allow the network to provide better link quality for the unicast PDSCH and also to support MU-MIMO transmissions of unicast PDSCHs. Beam management of unicast PDSCH based on a UE-specific RS, e.g. UE-specific CSI-RS can enable more refined beams to be used which can either increase the spectral efficiency or the range of the unicast PDSCH. Managing fine beams generally requires fast and frequent application of beam switching procedure.

To protect against error events associated with beam switching procedure and misalignment of the fine beams, or to deliver unicast messages that requires high reliability but not necessarily high spectral efficiency (e.g. RRC messages), there is a need to support fallback to more robust beams for unicast PDSCH. Therefore, unicast PDSCH can be of two types: fallback PDSCH, capable of robust unicast data transmission, and non-fallback unicast PDSCH, capable of high spectral efficiency/high data rate transmission. This implies that there is a need to support two different Tx beams (and correspondingly two different Rx beams) for transmitting the two types of unicast PDSCH.

For the fallback unicast PDSCH, the Tx beam used for transmission can correspond to a $1^{st}$ type of RS; whereas for the non-fallback unicast PDSCH, the TX beam used for transmission can correspond to a $2^{nd}$ type of RS. The $1^{st}$ type of RS can correspond to a cell-specific RS (e.g. NR-SSS, MRS, BRS, cell-specific CSI-RS) or a $1^{st}$ kind of UE-specific RS (e.g. UE-specific CSI-RS). The $2^{nd}$ type of RS can correspond to a UE-specific RS (e.g. UE-specific CSI-RS) (which is a $2^{nd}$ kind of UE-specific RS, if a $2^{st}$ one is defined for the fallback transmission). The UE uses the best/preferred detected/measured RS of the 1st type and the $2^{nd}$ type as the QCL reference to receive the fallback unicast PDSCH and the non-fallback unicast PDSCH, respectively. The Rx beam used by the UE to receive the fallback and non-fallback unicast PDSCH corresponds to the best/preferred detected/measure RS of the $1^{st}$ type and the $2^{nd}$ type, respectively. This UE procedure is illustrated in FIG. 11.

Figure 11:
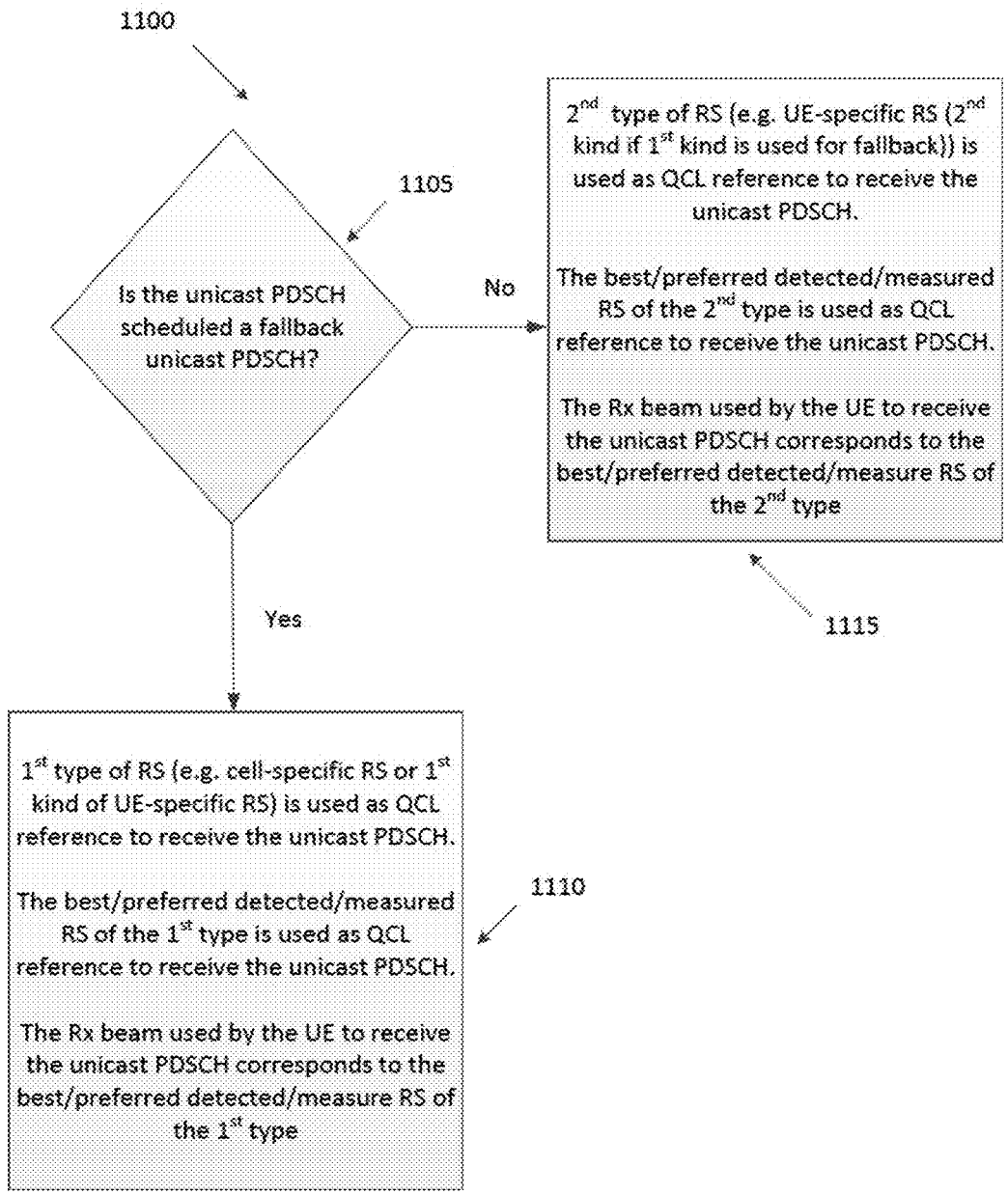
FIG. 11 illustrates an example UE procedure for receiving unicast fallback PDSCH and non-fallback PDSCH according to embodiments of the present disclosure.

FIG. 11 illustrates an example UE procedure 1100 for receiving unicast fallback PDSCH and non-fallback PDSCH according to embodiments of the present disclosure. An embodiment of the UE procedure 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

Figure 12:
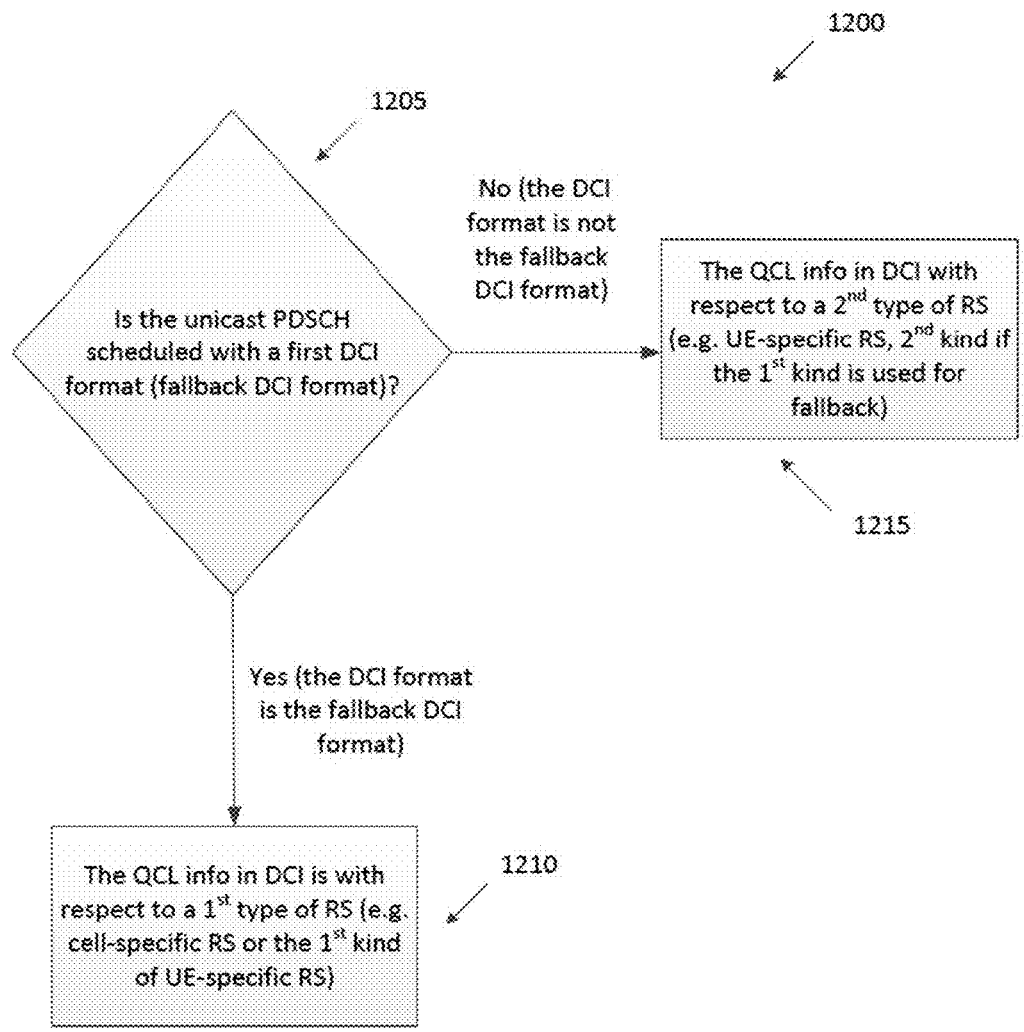
FIG. 12 illustrates an example procedure for RS according to embodiments of the present disclosure.

There is a need for the UE to determine if the unicast PDSCH to be received is a fallback PDSCH or not in order to implement the procedure as illustrated in FIG. 11. The following are some examples. In one example, if the unicast PDSCH is scheduled with a $1^{st}$ type of DCI format, the unicast PDSCH is a fallback PDSCH; else if the unicast PDSCH is scheduled with a $2^{nd}$ type of DCI format, the unicast PDSCH is a non-fallback PDSCH. This is illustrated in FIG. 12. The type of DCI format can be distinguished through the size of the DCI format, or through a flag in the DCI format.

FIG. 12 illustrates an example procedure for RS 1200 according to embodiments of the present disclosure. An embodiment of the procedure for RS 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In another example, if the unicast PDSCH is scheduled with a PDCCH detected/received in a $1^{st}$ PDCCH search space (e.g. common PDCCH search space, or UE-group common PDCCH search space), the unicast PDSCH is a fallback PDSCH; else if the unicast PDSCH is scheduled with a PDCCH detected/received in a $2^{nd}$ PDCCH search space (e.g. UE-specific PDCCH search space), the unicast PDSCH is a non-fallback PDSCH.

In yet another example, if the unicast PDSCH is scheduled with a PDCCH detected/received with the $1^{nd}$ type of RS as the reference QCL, the unicast PDSCH is a fallback PDSCH; else if the unicast PDSCH is scheduled with a PDCCH detected/received with the $2^{nd}$ type of RS as the reference QCL, the unicast PDSCH is a non-fallback PDSCH.

In yet another example, if the unicast PDSCH is multiplexed in the same (or overlapping) time domain resources as that for the PDCCH detected/received with the $1^{st}$ type of RS as the reference QCL, the unicast PDSCH is a fallback PDSCH; else if the unicast PDSCH is multiplexed in the same (or overlapping) time domain resources as that for a PDCCH detected/received with the $2^{nd}$ type of RS as the reference QCL, the unicast PDSCH is a non-fallback PDSCH.

In yet another example, if the DCI format scheduling the unicast PDSCH indicates the $1^{st}$ type of RS as the reference QCL for PDSCH reception, the unicast PDSCH is a fallback PDSCH; else if DCI format scheduling the unicast PDSCH indicates the $2^{nd}$ type of RS as the reference QCL for PDSCH reception, the unicast PDSCH is a non-fallback PDSCH. A bit field can be used to indicate the RS type. The RS type can also be indicated through unique RS index assignment for both types of RS (for example, RS id 1 to N can be used to indicate the $1^{st}$ type while RS id N+1 to N+M can be used to indicate the $2^{nd}$ type).

The DCI format for the unicast PDSCH can contain the Tx beam identity or the RS identity as part of the QCL information for receiving the PDSCH. For some of the methods above (e.g. the aforementioned examples), the UE can interpret if the QCL information is pertaining to the $1^{st}$ type of RS or the $2^{nd}$ type of RS. This is illustrated in FIG. 12 for the aforementioned example.

The above procedures can be extended to the deployment scenarios where there can be multiple TRPs transmitting multiple unicast PDSCHs that need to be received by the UE, or there can be multiple Tx beams from a single TRP, transmitting multiple unicast PDSCHs that need to be received by the UE. In these scenarios, the UE would maintain at least one best/preferred Tx beam from each TRP or each beam of a TRP, and determine the appropriate Rx beam and unicast PDSCH resources to receive for each TRP or each beam of a TRP.

Similar to PDSCH, there are also two types of PDCCH, namely UE-common PDCCH and UE-specific PDCCH. UE-common PDCCH may be received by multiple UEs, while UE-specific PDCCH may be received by a specific UE. Therefore, it would be beneficial to employ different beams for UE-common PDCCH and UE-specific PDCCH, implying the need for different beam management procedure for the two types of PDCCHs.

The downlink control channel and the downlink data channel generally have different requirement on their link performances. The downlink control channel requires high reliability and does not require high data rate. On the other hand, the downlink data channel can target high data rate and can utilize retransmission mechanism to increase reliability. Thus, configuration of different beams used for control channel and data channel may be supported. For example, the beams used for downlink control channel can have wider beam width (compared to that for downlink data channel) so that the beams are robust with respect to UE mobility and signal blockage. For the data channel, narrower beams can be used to deliver high beamforming gain so that higher data rate can be supported.

Different transmission schemes can also be applied to the downlink control channel and the downlink data channel. For example, the downlink control channel can use a single port or a transmission diversity scheme, whereas the downlink data channel can use multi-layer MIMO or multi-point transmissions, e.g., non-coherent joint transmission (JT). Different transmission schemes may require different set of TRP Tx beams.

In addition, downlink control channels can be divided into UE-common (or UE-group common) downlink control channel and UE-specific downlink control channel. Since UE-common downlink control channel targets multiple UEs, while UE-specific downlink control channel targets only a single UE, it would be beneficial to employ different beams for UE-common downlink control channel and UE-specific downlink control channel, implying different beam management procedures for UE-common and UE-specific downlink control channels.

When considering the beam management procedure for UE-common downlink control channel, there is a need to take into account that such downlink control channels need to be received by the UE during the initial access procedure, as well as during idle mode. As such, there is a need for a beam management procedure that does not require active management by the network based on UE feedback. This would also avoid frequent idle-RRC connected state transition just for the purpose of beam management. The network may need to transmit UE-common downlink control channels on all the network's Tx beams in the same way as NR synchronization signals and NR PBCH. It also follows that the RS used for beam measurement by the UE (to determine the best Rx beam to receive the UE-common control channel) may be based on a cell-specific RS, which can be one or more of NR-SSS, mobility RS (MRS), BRS or cell-specific CSI-RS. Other types of cell-specific RS are also possible. Based on the measurement of a set of cell-specific RSs, the UE can determine the best or preferred Tx beam and Rx beam (if multiple Rx beams can be employed by the UE) to receive the UE-common PDCCH.

Figure 13:
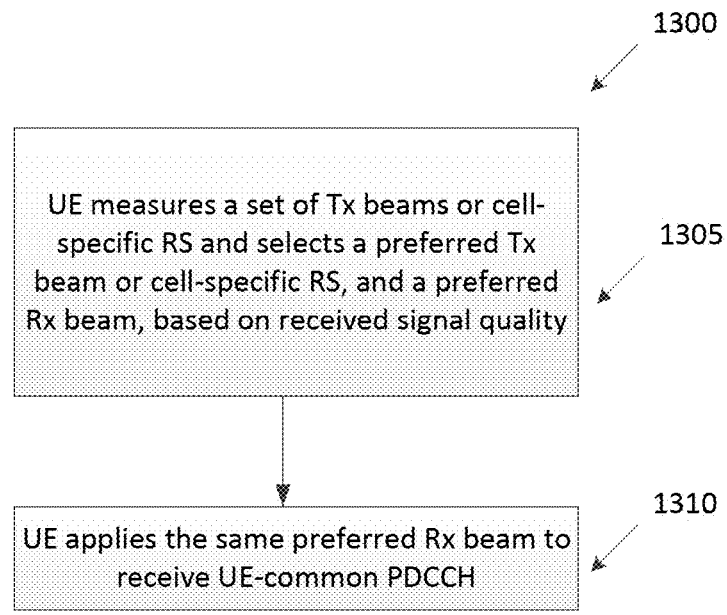
FIG. 13 illustrates an example UE procedure for determining the Rx beam to receive UE-common PDCCH according to embodiments of the present disclosure.

FIG. 13 illustrates an example UE procedure 1300 for determining the Rx beam to receive UE-common PDCCH according to embodiments of the present disclosure. An embodiment of the UE procedure 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

Figure 14:
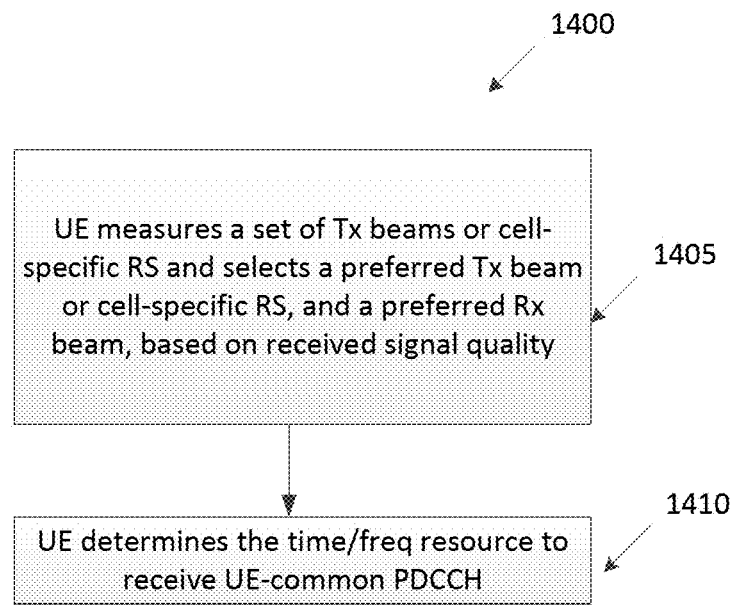
FIG. 14 illustrates an example UE procedure for determining the time/frequency resource to receive UE-common PDCCH according to embodiments of the present disclosure.

FIG. 14 illustrates an example UE procedure 1400 for determining the time/frequency resource to receive UE-common PDCCH according to embodiments of the present disclosure. An embodiment of the UE procedure 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

It may be noted that the UE procedures as described in FIG. 13 and FIG. 14 can be the same as those described in FIG. 7 and FIG. 8, i.e. the same procedure is used by the UE to determine the Rx beam and the time/frequency resource to receive UE-common PDCCH and common PDSCH.

Similar to the common PDSCH procedure, the time-frequency resource for receiving UE-common PDCCH can depend on the best/preferred Tx beam or cell-specific RS determined by the UE. The mapping of the Tx beam to the time-frequency resource can be predefined in the standards specifications, or informed by the network in a broadcast message such as in a PBCH.

The methods as described for the common PDSCH and as illustrated in FIG. 14 can be applied to UE-common PDCCH in the sense that the UE is only required to search for the UE-common PDCCH search space in the configured time and/or frequency windows or sub-windows, corresponding to the best/preferred Tx beam.

The above procedures can be extended to the deployment scenarios where there can be multiple TRPs transmitting multiple UE-common PDCCHs that need to be received by the UE, or there can be multiple Tx beams from a single TRP, transmitting multiple common PDCCHs that need to be received by the UE. In these scenarios, the UE would maintain at least one best/preferred Tx beam from each TRP or each beam of a TRP, and determine the appropriate Rx beam and UE-common PDCCH resources to receive for each TRP or each beam of a TRP.

For the UE-specific downlink control channel, it would be beneficial, even necessary, for the UE to indicate to the network the best Tx beam to receive the downlink control channel, as such UE feedback would allow the network to provide better link quality for the downlink control channel and also to support MU-MIMO transmissions of UE-specific control channels. Nevertheless, it is worth noting that it may not be precluded to support to transmission of UE-specific downlink control channels on the same beam(s) as those used for UE-common downlink control channels.

There are two options for the RS to be used for beam measurement and reporting by the UE, for the purpose of beam management for UE-specific PDCCH. In one option, the RS is a cell-specific RS, which is one or more of NR-SSS, MRS or cell-specific CSI-RS). With cell-specific RS, the network can obtain UE measurement report as soon as in Msg 3 of random access procedure during the initial access procedure and starts transmission of UE-specific PDCCH on the preferred Tx beam by the UE from Msg 4 onwards. Beam management including beam switching can be subsequently performed based on regular UE measurement reports on a set of cell-specific RSs.

In another option, the RS used is a UE-specific RS, such as a UE-specific CSI-RS. Beam management of UE-specific control channel based on UE-specific CSI-RS can enable more refined beams to be used which can either increase the spectral efficiency or the range of the downlink control channel. However, similar to the unicast PDSCH, it can be beneficial to define fallback UE-specific PDCCH and a non-fallback UE-specific PDCCH.

For the fallback UE-specific PDCCH, the Tx beam used for transmission can correspond to a $1^{st}$ type of RS; whereas for the non-fallback UE-specific PDCCH, the Tx beam used for transmission can correspond to a $2^{nd}$ type of RS. The $1^{st}$ type of RS can correspond to a cell-specific RS (e.g. NR-SSS, MRS, BRS, cell-specific CSI-RS) or a $1^{st}$ kind of UE-specific RS (e.g. UE-specific CSI-RS). The $2^{nd}$ type of RS can correspond to a UE-specific RS (e.g. UE-specific CSI-RS) (which is a $2^{nd}$ kind of UE-specific RS, if a 2st one is defined for the fallback transmission). The UE uses the best/preferred detected/measured RS of the 1st type and the $2^{nd}$ type as the QCL reference to receive the fallback UE-specific PDCCH and the non-fallback UE-specific PDCCH, respectively. The Rx beam used by the UE to receive the fallback and non-fallback UE-specific PDCCH corresponds to the best/preferred detected/measure RS of the $1^{st}$ type and the $2^{nd}$ type, respectively. This UE procedure is illustrated in FIG. 15.

Figure 15:
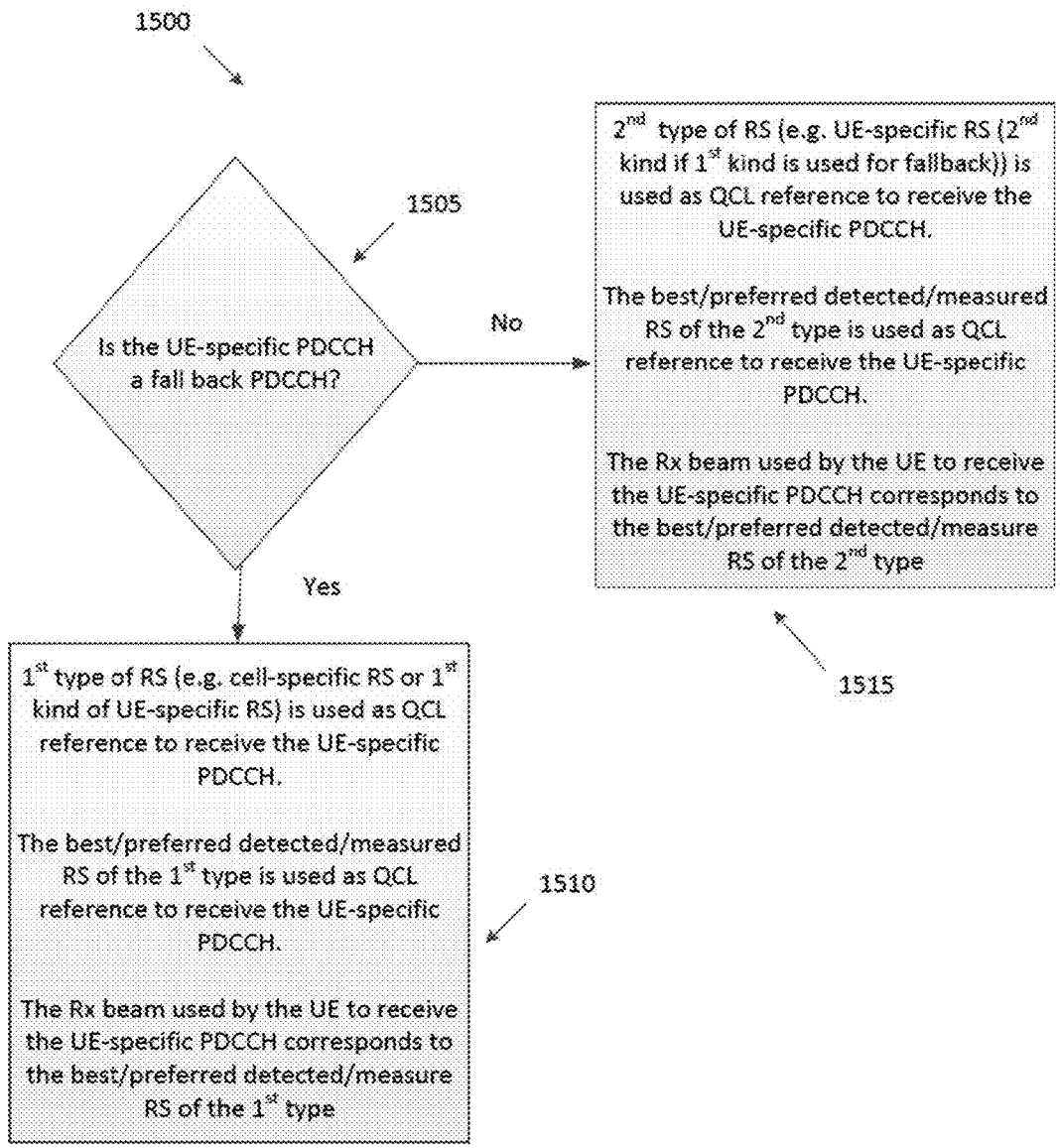
FIG. 15 illustrates an example UE procedure for receiving UE-specific fallback PDCCH and non-fallback UE-specific PDCCH according to embodiments of the present disclosure.

FIG. 15 illustrates an example UE procedure 1500 for receiving UE-specific fallback PDCCH and non-fallback UE-specific PDCCH according to embodiments of the present disclosure. An embodiment of the UE procedure 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

There is a need for the UE to determine if the UE-specific PDCCH to be received is a fallback PDCCH or not in order to implement the procedure as illustrated in FIG. 11. The following are some examples. In one example, if the UE-specific PDCCH is detected/received in a $1^{st}$ PDCCH search space (e.g. common PDCCH search space, or UE-group common PDCCH search space), the UE-specific PDCCH is a UE-specific PDCCH; else if the UE-specific PDCCH is detected/received in a $2^{nd}$ PDCCH search space (e.g. UE-specific PDCCH search space), the UE-specific PDCCH is a non-fallback PDCCH.

In another example, if the UE-specific PDCCH is detected/received with the $1^{st}$ type of RS as the reference QCL, the UE-specific PDCCH is a fallback PDSCH; else if the UE-specific PDCCH is detected/received with the $2^{nd}$ type of RS as the reference QCL, the UE-specific PDCCH is a non-fallback PDCCH.

In yet another example, if the UE-specific PDCCH is multiplexed in the same (or overlapping) time domain resources as that for the UE-common PDCCH, or other common physical channels/signals such as NR PBCH/NR SS (which is detected/received with the $1^{st}$ type of RS as the reference QCL), the UE-specific PDCCH is a fallback PDSCH; else if the UE-specific PDCCH is not multiplexed in the same (or overlapping) time domain resources as that for the UE-common PDCCH or other common physical channels/signals such as NR PBCH/NR SS, the UE-specific PDCCH is a non-fallback PDCCH.

The above procedures can be extended to the deployment scenarios where there can be multiple TRPs transmitting multiple UE-specific PDCCHs that need to be received by the UE, or there can be multiple Tx beams from a single TRP, transmitting multiple UE-specific PDCCHs that need to be received by the UE. In these scenarios, the UE would maintain at least one best/preferred Tx beam from each TRP or each beam of a TRP, and determine the appropriate Rx beam and UE-specific PDCCHs resources to receive for each TRP or each beam of a TRP.

When the UE is in an RRC connected mode or in non-idle mode, the UE can feed back to the network the measurement reports of the beams or the RS corresponding to the beams, or indicate its preferred Tx beams or equivalently the identity of the RS corresponding to the preferred Tx beams. Certain common PDSCHs can be UE-group common in nature. In other words, the PDSCH targets a subset of UEs served by the TRP, rather than all UEs served by the TRP. Examples of such common PDSCHs are random access responses (RAR), paging, or certain system information blocks (SIBs). It can be beneficial from the network's perspective if it can identify the best Tx beam to transmit to a subset of UEs even for common PDSCHs, to improve the data rate or to increase reliability of transmission.

The network can also perform spatial division multiplexing on multiple subsets of UEs and transmit different data streams on different UE-group common PDSCHs. However, for certain common PDSCHs such as those corresponding to SIB that contains essential system access information (analogous to SIB1 and SIB2 in LTE), they may be received by all UEs. Therefore, if the network wants to apply different transmission schemes to different set of common PDSCHs, there is a need for the UE to determine how the UE may receive the different set of common PDSCHs, e.g. in the form of beam management procedure. Determining the best/preferred Tx beam to receive a signal or channel means the UE can determine the DL RS that can be considered QCL-ed with the signal or the channel, and the Rx beam that the UE may use to receive the signal or the channel.

In one embodiment, the set of common PDSCHs whereby the beams to receive them is indicated by the network is predefined in the standards specifications. This reduces signaling overhead and simplifies a UE procedure. In another embodiment, the set of common PDSCHs whereby the beams to received is indicated by the network is configured by the network. This allows network flexibility to determine which set of common PDSCHs which it wants to apply specific transmission schemes, such as MU-MIMO and precoding. In one example, a first beam for receiving a first set of common PDSCHs can be based on UE selection of the best or preferred Tx beam or cell-specific RS; whereas a second beam for receiving a second set of common PDSCHs can be based on network indication.

The first set of common PDSCHs can be predefined in standards to be the PDSCHs to deliver system information blocks containing essential system information such as the system bandwidth, the PRACH resources, PLMD id, etc. It can also be configured by the network to include other common PDSCHs such as RAR and paging. The first beam can be the same as the beam used for receiving NR PBCH. The second set of common PDSCHs can be predefined in standards to be RAR and paging or can be configured by the network to include one or more of the aforementioned common PDSCHs. For paging, it can be specified that the UE uses different beams or apply beam management procedure depending on whether the UE is in RRC connected more or not. When the UE is in idle mode, paging is received with the first beam; else paging is received with the second beam.

Figure 16:
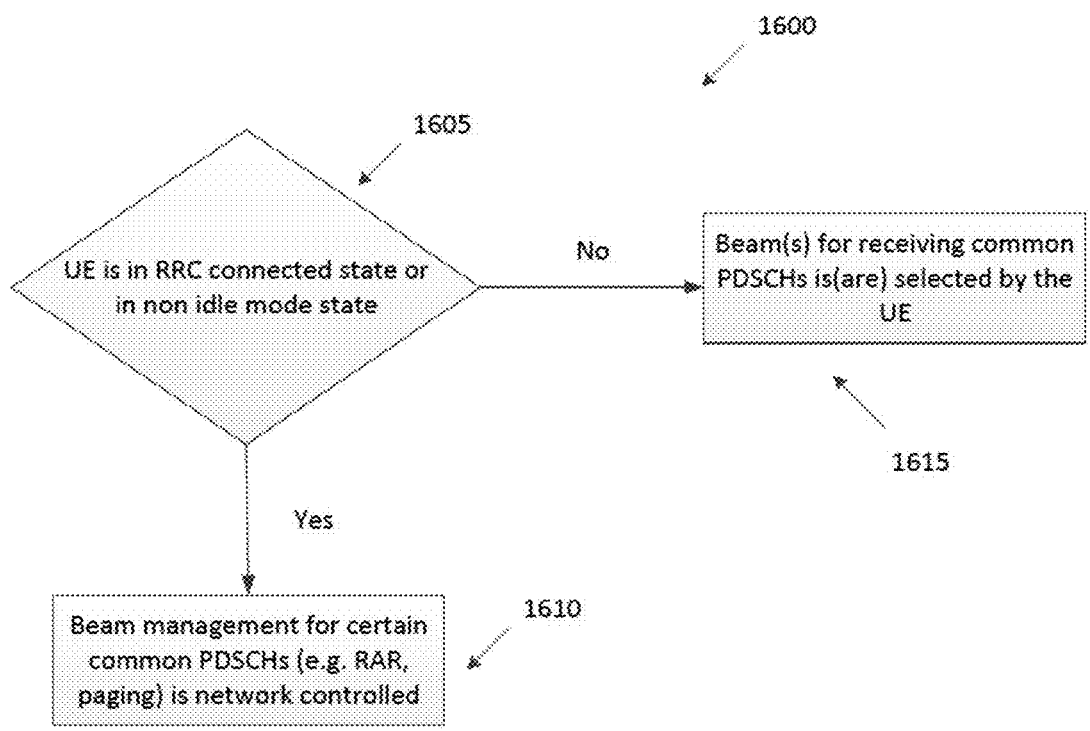
FIG. 16 illustrates an example UE procedure of determining beams for receiving common PDSCHs according to embodiments of the present disclosure.

FIG. 16 illustrates an example UE procedure 1600 of determining beams for receiving common PDSCHs according to embodiments of the present disclosure. An embodiment of the UE procedure 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

The procedure of determining beams to be used for receiving certain common PDSCHs can depend on whether the UE is in RRC connected state or in non-idle mode. This is illustrated in FIG. 16.

In general, there are three options for the control signaling for beam indication. The beam indication can refer to indication of BPL, TX RS resource (including SS block signal such as NR-SSS/PBCH DM-RS, CSI-RS), QCL reference. The signaling options' pros and cons are summarized below. In one example of RRC signaling, this can be realized by including QCL information in the RRC control message, e.g. the RS information that is QCL-ed with the PDSCHs to be scheduled. In such example, advantages are: more reliable signaling (error probability $\sim 10^{-6}$) compared to MAC CE signaling (error probability $\sim 10^{-3}$) and DCI signaling (error probability ~$10^{-2}$); and RRC signaling is ACK/NACK-ed by the UE. In such example, disadvantages are: longer signaling latency (up to 15 ms based on LTE, although it can be shorter typically) compared to MAC CE signaling (~6 ms based on LTE numerology) and DCI signaling (~a few OFDM symbols); and signaling overhead is larger compared to the DCI signaling approach since PDSCH is needed. PDCCH scheduling the RRC message needs larger size than that for the PDCCH for DCI signaling.

In another example of MAC signaling (e.g. with MAC control element (CE)), this can be realized by including QCL information in the MAC CE, e.g. the RS information that is QCL-ed with the PDSCHs to be scheduled. In such example, advantages are: more reliable than DCI signaling; signaling is ACK/NACK-ed by the UE; and signaling latency is slightly lower compared to RRC signaling. In such example, disadvantages are: signaling latency is larger than DCI signaling; and signaling overhead is larger compared to the DCI signaling approach since PDSCH is needed. PDCCH scheduling the MAC CE needs larger size than that for the PDCCH for DCI signaling.

In yet another example of DCI signaling, this can be realized by including QCL information in the DL assignment DCI, e.g. the RS information that is QCL-ed with the scheduled PDSCH. In one instance, there is a DCI signaling separate from the DCI for DL assignment. In such instance, advantages are: lower signaling latency compared to RRC and MAC CE signaling; and signaling overhead is smaller since PDSCH is not needed. In such instance, disadvantages are: less reliable compared to RRC and MAC CE signaling; and signaling is not ACK/NACK-ed by the UE.

Implicit DCI indication for PDSCH beam (rather than explicit DCI field) is also possible. Some example approaches are given below: apply a mask to scramble CRC parity bits for the DCI message where the mask is generated as a function of the BPL/beam/RS/QCL reference index used to transmit the corresponding PDSCH; and scramble the RNTI value of the DCI with a number which is generated as a function of the corresponding BPL/beam/RS/QCL reference index. Due to the different attributes associated with each signaling method, different signaling method can be used for beam indication for different PDSCH types.

Figure 17:
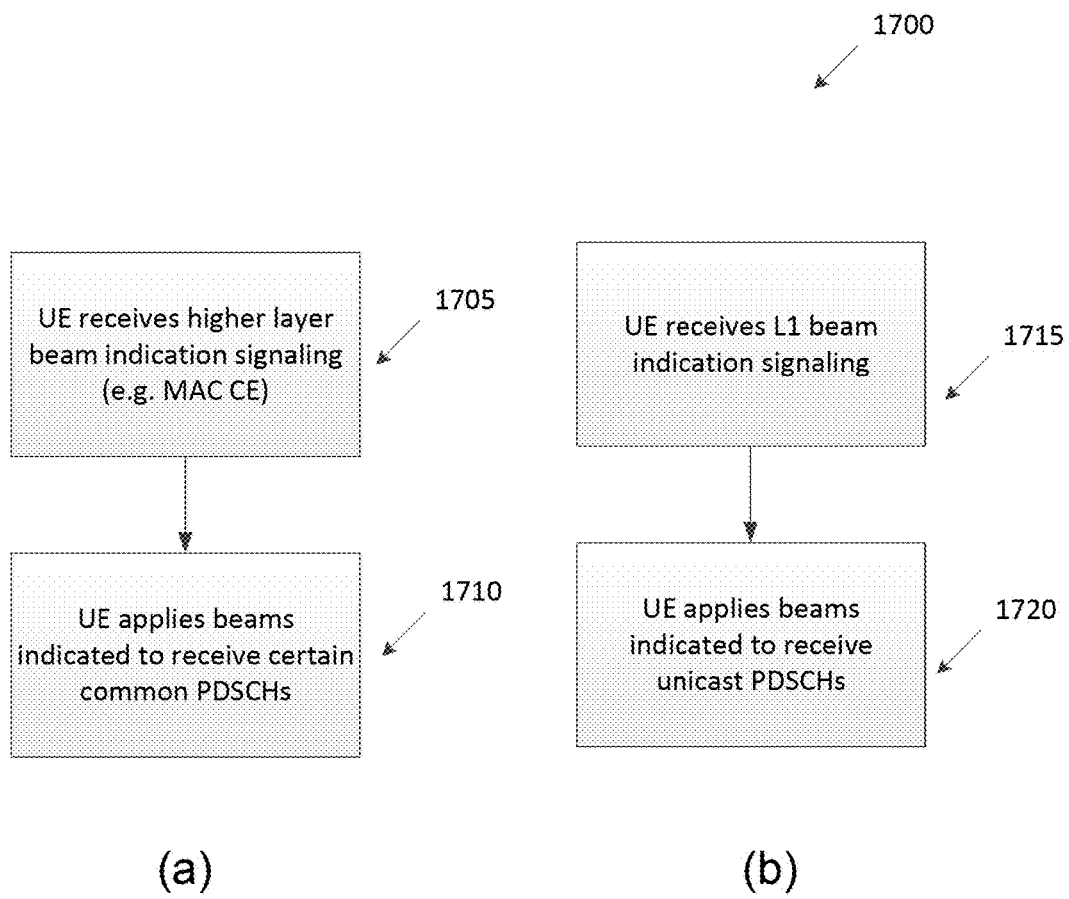
FIG. 17 illustrates an example UE procedure for determining the control signaling method depending on the PDSCH type according to embodiments of the present disclosure.

FIG. 17 illustrates an example UE procedure 1700 for determining the control signaling method depending on the PDSCH type according to embodiments of the present disclosure. An embodiment of the UE procedure 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one embodiment, a higher layer based beam indication (e.g. MAC CE) signaling is used for receiving common PDSCHs (or a subset of common PDSCHs); whereas L1 based beam indication signaling (with PDCCH) is used for receiving unicast PDSCHs. The procedures are illustrated in FIG. 17(*a*) and FIG. 17(*b*). Whether a PDSCH is common or unicast is distinguished with the RNTI type that is associated with the PDSCHs (e.g. the RNTI is used to scramble the PDSCH and is associated with the PDCCH that schedules the PDSCH). It is also noted that the same higher layer beam indication signaling can be applied to both the common PDSCHs and the PDCCHs beam management procedure.

In one embodiment, the beam indication for common or UE-group common PDSCH and PDCCH is done with higher layer signaling such as an RRC signaling or a combination of RRC and MAC CE signaling; in this case, the PDCCH scheduling the common or UE-group common PDSCH does not include L1 beam indication. The beam indication for unicast PDSCH is done with at least L1 signaling (including a combination of RRC and L1 signaling, or a combination of RRC, MAC CE and L1 signaling) as a part of the DCI scheduling the unicast PDSCH.

In another embodiment, the same signaling method is used for both common PDSCH and unicast PDSCH, but the signaling carries an indication information to indicate if the signaling is applied to common PDSCHs (or the configured common PDSCHs) or the unicast PDSCHs. An example of the indication information can be an explicit bit field in the signaling. This is illustrated in FIG. 18.

Figure 18:
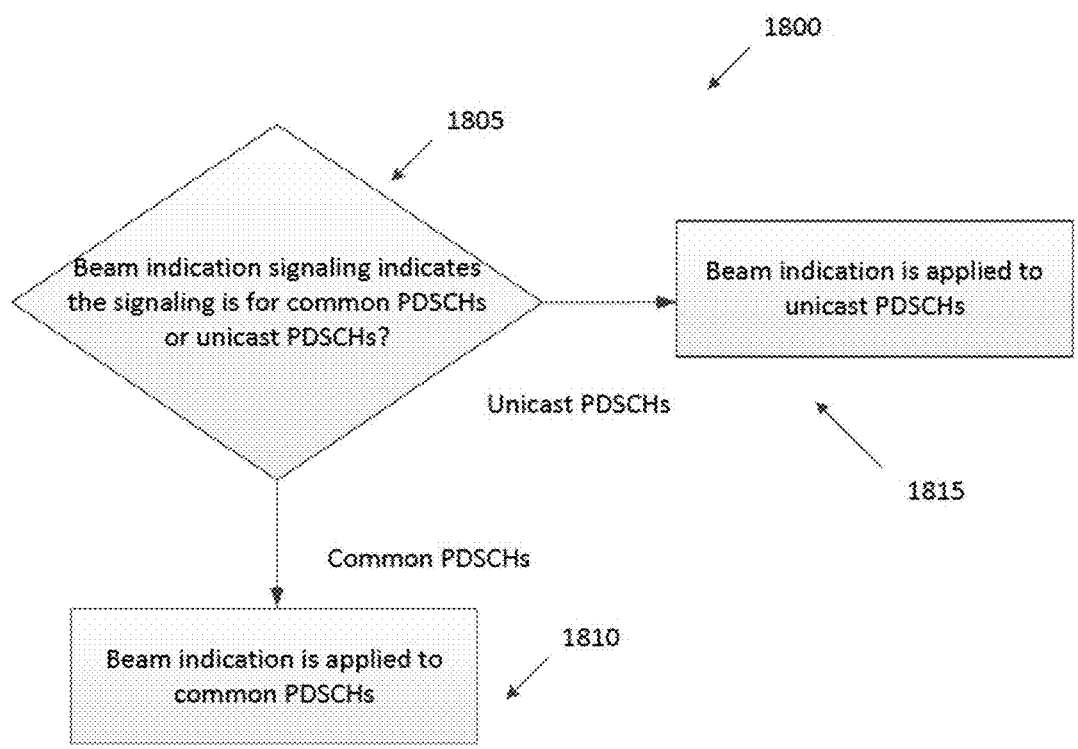
FIG. 18 illustrates an example UE procedure for determining the PDSCH type associated with the beam indication signaling according to embodiments of the present disclosure.

FIG. 18 illustrates an example UE procedure 1800 for determining the PDSCH type associated with the beam indication signaling according to embodiments of the present disclosure. An embodiment of the UE procedure 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In one example of this method, the higher layer (e.g. MAC CE) configures the UE with K_pdsch>=1 separate set of beam pair links (BPL) for NR-PDSCH and K_pdcch>=1 BPLs for NR-PDCCH. The MAC-CE jointly indicates the type of PDSCH/PDCCH (fallback/non-fallback) and the BPL information (which beam to apply). Specifically, each PDSCH BPL is associated with a 1 bit Type indicator [Type 0 (used for common PDSCH) or Type 1 (unicast PDSCH)] conveyed in the MAC CE. This helps the UE to establish a linkage between a BPL and the type of PDSCH (resp. PDCCH). Similar principles can be applied for the PDCCH BPL signaling. In the scheduling DCI, the indication field indicates an index into the above table. This also enables further compression of the RS resource signaling within the L1 message.

Figure 19:
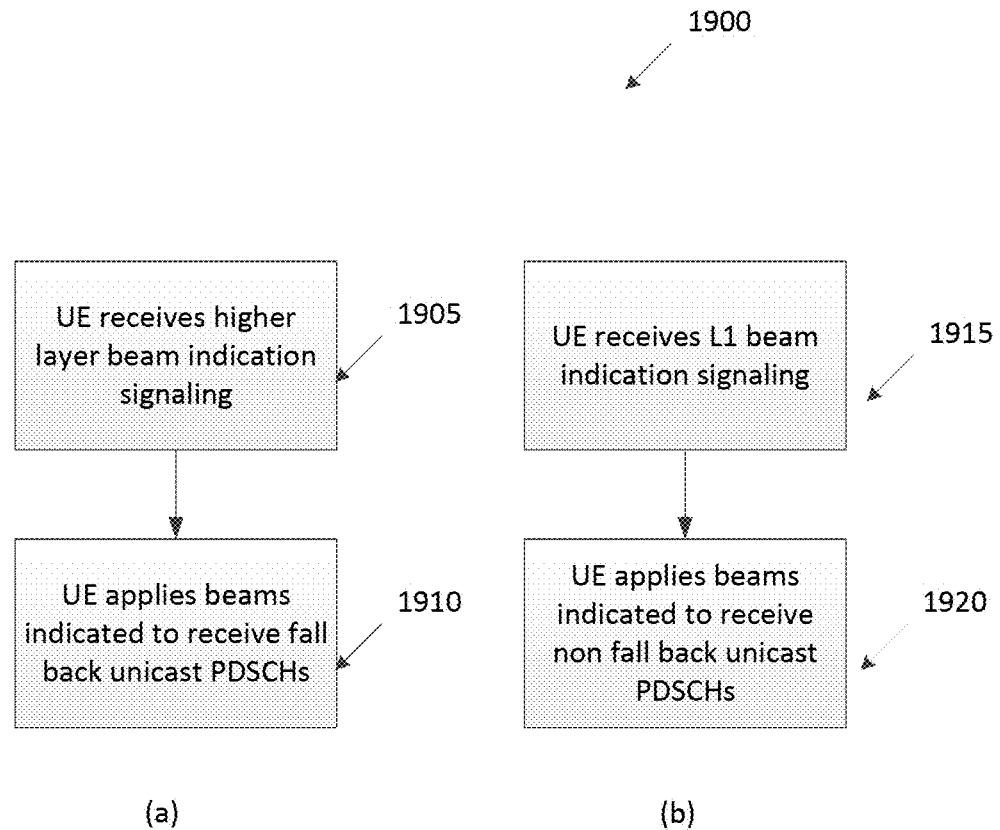
FIG. 19 illustrates an example UE procedure for determining the control signaling scheme depending on the unicast PDSCH type according to embodiments of the present disclosure.

FIG. 19 illustrates an example UE procedure 1900 for determining the control signaling scheme depending on the unicast PDSCH type according to embodiments of the present disclosure. An embodiment of the UE procedure 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

In another embodiment, a higher layer based beam indication (e.g. MAC CE) signaling is used for receiving fallback unicast PDSCHs; whereas L1 based beam indication signaling (with PDCCH) is used for receiving non-fallback unicast PDSCHs. In this case, the DCI scheduling the fallback unicast PDSCHs do not have explicit bit field for the L1 beam indication. Fallback PDSCH is capable of robust unicast data transmission, and non-fallback unicast PDSCH is capable of high spectral efficiency/high data rate transmission. The procedures are illustrated in FIG. 19(*a*) and FIG. 19(*b*). Whether a unicast PDSCH is fallback or non-fallback can be distinguished by DCI format type, search space, transmission scheme, control resource set (CORESET) or the like.

In another embodiment, the same signaling method is used for both fallback unicast PDSCH and non-fallback unicast PDSCH, but the signaling carries indication information to indicate if the signaling is applied to fallback unicast PDSCHs or the non-fallback unicast PDSCHs. An example of the indication information can be an explicit bit field in the L1 beam indication signaling. The L1 beam indication signaling can be a newly designed DCI format. The L1 beam indication signaling can also be included in the DL assignment DCI formats.

In one example, the DL assignment DCI format for fallback unicast PDSCH includes only the beam indication information for fallback unicast PDSCH, while the DL assignment DCI format for non-fallback unicast PDSCH includes only the beam indication information for non-fallback unicast PDSCH. In another example, the DL assignment DCI formats for both types of unicast PDSCHs include the beam indication for both types of unicast PDSCHs. This increases the reliability of overall signaling mechanism. In yet another example, the DL assignment DCI formats for fallback unicast PDSCHs include the beam indication for both types of unicast PDSCHs, while the DL assignment DCI formats for non-fallback unicast PDSCHs include the beam indication for only the non-fallback unicast PDSCHs. In yet another example, the DL assignment DCI formats for non-fallback unicast PDSCHs include the beam indication for both types of unicast PDSCHs, while the DL assignment DCI formats for fallback unicast PDSCHs include the beam indication for only the fallback unicast PDSCHs.

In another example, the higher layer (e.g. MAC CE) configures the UE with $K\_pdsch>=1$ separate set of beam pair links (BPL) for NR-PDSCH and $K\_pdcch>=1$ BPLs for NR-PDCCH. The MAC-CE jointly indicates the type of PDSCH/PDCCH (fall-back/non fall-back) and the BPL information (which beam to apply). Specifically, each PDSCH BPL is associated with a 1 bit Type indicator [Type 0 (used for fallback PDSCH) or Type 1 (non-fallback PDSCH)] conveyed in the MAC CE. This helps the UE to establish a linkage between a BPL and the type of PDSCH (resp. PDCCH). In the scheduling DCI, the indication field indicates an index into the above table. This also enables further compression of the RS resource signaling within the L1 message.

In another embodiment, a DCI format for a beam indication is specified for indicating the beams to be used for fallback unicast PDSCH, whereas the beam indication information is included in the DL assignment DCI for the non-fallback unicast PDSCH. This allows the DCI format for beam indication for fallback.

Although the beam indication methods above are described for PDSCH, the methods can also be applied to the PDCCH that is used to schedule the PDSCH. In one embodiment, the beam indication for fallback PDSCH (in addition to common or UE-group common PDSCH) and PDCCH is done with higher layer signaling such as RRC signaling or a combination of RRC and MAC CE signaling; in this case, the PDCCH scheduling the fallback PDSCH does not include L1 beam indication. The beam indication for non-fallback PDSCH is done with at least L1 signaling (including a combination of RRC and L1 signaling, or a combination of RRC, MAC CE and L1 signaling) as a part of the DCI scheduling the non-fallback PDSCH.

The beam indication procedure for PDSCH can be implemented as follows, where QCL signaling is assumed to be the realization of beam indication signaling.

In step 1, RRC configures RS resource sets/settings (resourceConfig), resources and ports which are the possible QCL references for receiving data and/or control channels. In such step, the RS is CSI-RS and can also be a RS from SS block, such as NR SSS, NR PBCH DM-RS. In such step, the RRC signaling can be the same RRC signaling to configure the set of RS for CSI acquisition, or it can be separate RRC signaling. In such step, there is a QCL identifier configured for each QCL reference, which is used for signaling in the later steps. In one option, the identifier is the same as the identifier for the RS resource. In another option, there is a separate identifier for QCL reference in case certain RS resources configured by RRC do not serve as QCL references. This has the benefit of reducing the range and bit width needed for indicating the QCL references in the later steps.

In step 2, the set of RS that is used for QCL reference is further down-selected by one or more MAC CE signaling. This step is beneficial if there is a large number of QCL references configured in Step 1. Step 2 can be used to reduce the possible RS that the UE is required to monitor for assisting channel estimations for PDSCH demodulation. The network can perform the down-selection with MAC CE signaling from measurement results reported by the UE. Hence the signaling effectively indicates the set of beam-pair links (BPLs). A BPL is formed by the UE through association of an RS measures to the receive beam (also called UE Rx spatial QCL) that the UE uses to perform the measurement. The MAC CE signaling can include one or more of the following.

In one example, MAC CE signaling to indicate activation or deactivation of RS, e.g. via indicating the identifier for the activated RS. If the RS is activated, it is used for QCL reference; else if the RS is deactivated, it is not used for QCL reference. In another alternative, for each RS that is indicated to be activated, there is another bit in the same MAC CE signaling that indicates if the RS is to be used for QCL reference. For example, bit value 1 indicates the activated RS is used for QCL reference, else bit value 0 indicates the activated RS is not used for QCL reference. The second alternative allows the network to configure the UE to track and report the strength of candidate beams which could potentially become stronger as the UE moves within the cell.

In another example, MAC CE signaling to indicate activation or deactivation of RSRP/CSI reporting. If the RS is not associated with any activated reporting, the RS is not used for QCL reference; else the RS is used for QCL reference.

In yet another example, MAC CE signaling to indicate RS to be used for QCL reference (or the RS not to be used for QCL reference, which can achieve the same effect). The RS could correspond to P/SP CSI-RS or SS Block or an on-demand resource such as AP CSI-RS. The advantage of this signaling is that it can be used to exclude RS that cannot be deactivated in (a) or (b). For example, SS block or periodic CSI-RS that cannot be excluded in (a) or (b) can be excluded from QCL reference with (c). The signaling can also indicate a aperiodic CSI-RS to be used for QCL reference; in one example, if there is another P/SP-CSI-RS that is indicated to be QCL-ed with the aperiodic CSI-RS, the UE assumes it may utilize the QCL-ed P/SP-CSI-RS when the aperiodic CSI-RS is indicated as the QCL reference. The QCL relation between the P/SP-CSI-RS and the aperiodic CSI-RS can be indicated by dynamic or semi-static signaling (e.g. via MAC CE signaling or RRC signaling).

In the aforementioned embodiments, the linkage between a QCL reference and the BPL for PDSCH reception can be established in either an implicit or an explicit manner. In an implicit method the UE assumes that the PDSCH BPL index is identical to the identifier of the activated QCL reference. In another implicit method, the UE assumes that the PDSCH BPL index is linked to the order (e.g. chronological) in which the MAC CE is received. In an explicit method, the MAC-CE additionally contains a PDSCH BPL index field in addition to indicating the index of the activated RS.

In one embodiment of the explicit method, if that PDSCH BPL index is previously associated with a RS resource j as QCL reference, then upon reception of a MAC-CE associating that PDSCH BPL index with a second (different) QCL reference RS resource k, the UE assumes that RS resource j has been deactivated and subsequently applies for that BPL, the UE's receive beam (spatial filter) associated with QCL reference k. In a second different embodiment of the explicit method, if that PDSCH BPL index is associated with a RS resource j as QCL reference, then upon reception of a MAC-CE associating that PDSCH BPL index with a second (different) QCL reference RS resource k, then the UE treats both RS resources j and k as activated, while receiving that PDSCH BPL assuming QCL reference k. This embodiment is useful if the network wants to replace a PDSCH BPL that was earlier used for receiving a coarse beam (E.g. P/SP CSI-RS) with a refined beam (e.g. AP CSI-RS).

Figure 20:
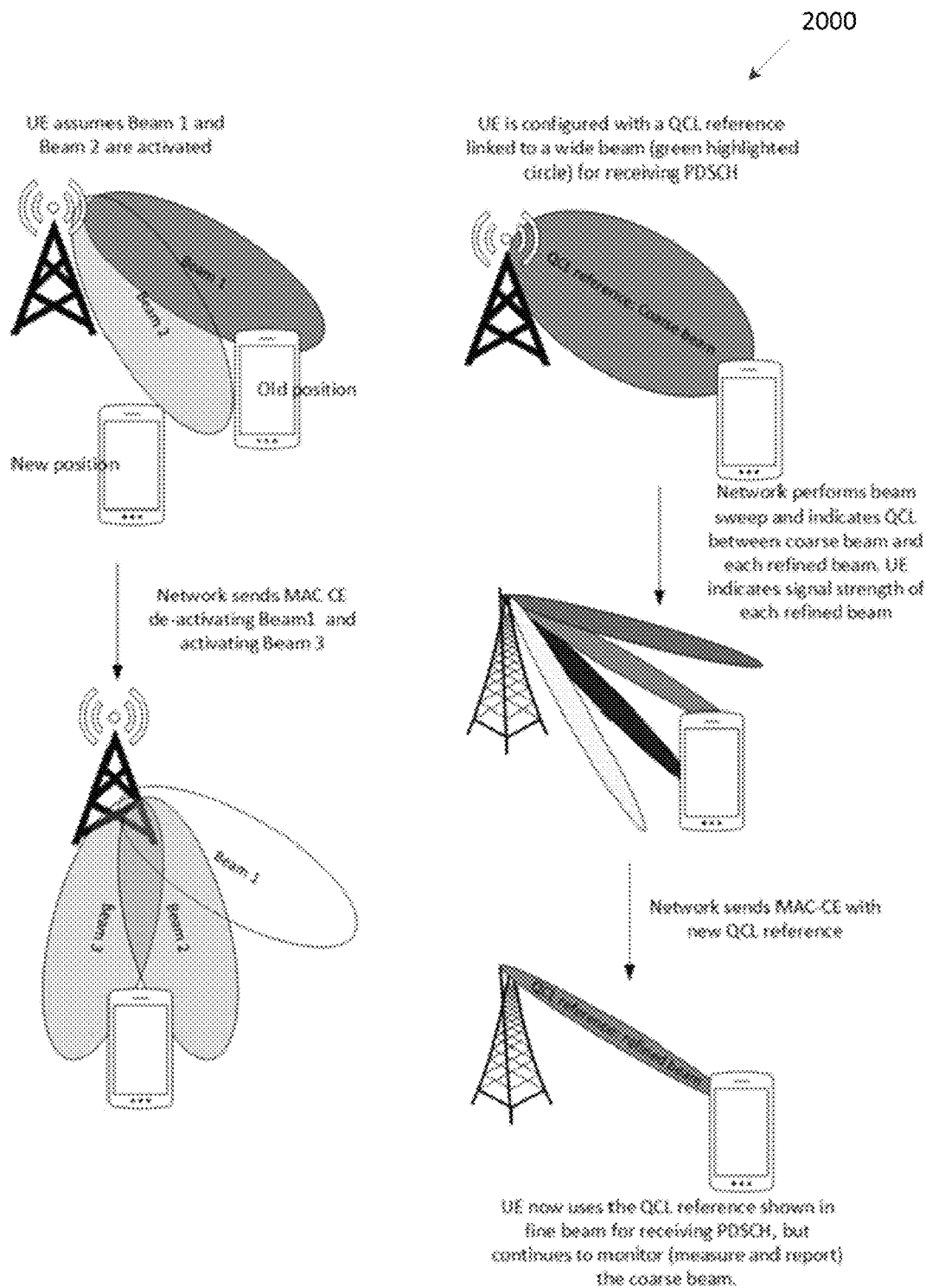
FIG. 20 illustrates an example MAC-CE signaling to update QCL reference according to embodiments of the present disclosure.

FIG. 20 illustrates an example MAC-CE signaling 2000 to update QCL reference according to embodiments of the present disclosure. An embodiment of the MAC-CE signaling 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

FIG. 20 shows two examples demonstrating how the network can, via MAC-CE signaling, dynamically vary the assumed QCL reference at the UE for receiving PDSCH thereby adapting to different phenomena (e.g., UE mobility, orientation changes, blockage etc.).

The use of MAC CE signaling to down select QCL references can be configurable. The reason is that if the number of beams or RS configured by RRC is not large and can be addressed by the bit field in the DCI, then the need for further down-selection is not strong.

In step 3, DCI signaling indicates one of the BPLs indicated in previous MAC CE (s) for PDSCH reception. The bit field indicates the QCL reference ID which can be one of the RS resource sets, resources, port IDs configured by RRC and MAC CE (if configured). There are two methods for mapping the bit field value to the QCL reference ID when the MAC CE signaling is configured.

In such step, only the QCL references that are not deactivated are mapped to the bit field value. QCL references that are deactivated are not mapped to any bit field value. This means that the mapping is dynamically changed with the activation and deactivation status of the QCL references as controlled by the MAC CE signaling. This method is illustrated in FIG. 21(a). In such step, the QCL references that are deactivated are only considered valid if the QCL references are indicated via DCI for the network, i.e. the UE treats the indication of a deactivated QCL reference as an error event.

Figure 21:
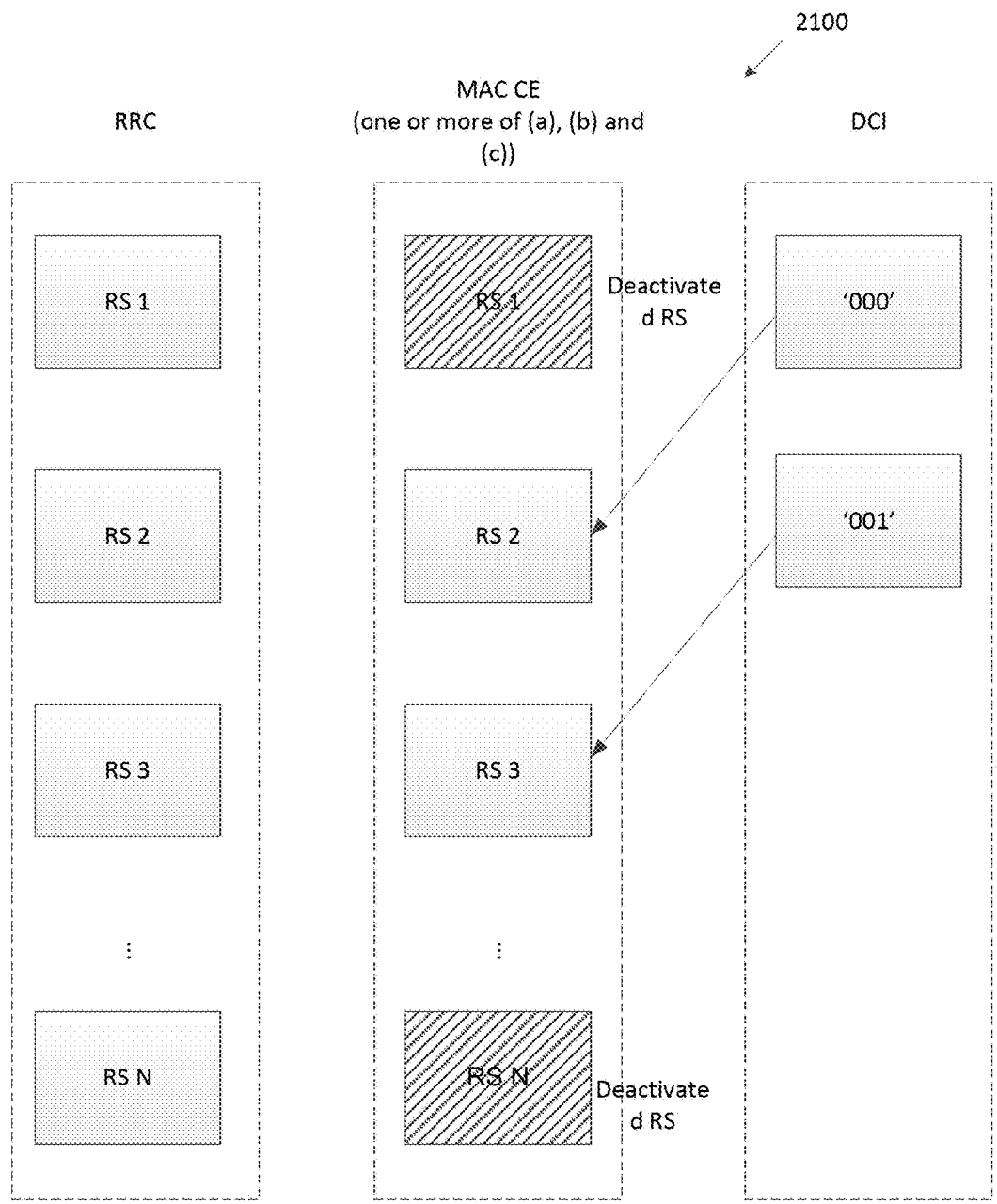
FIG. 21 illustrates an example RRC, MAC-CE, and DCI according to embodiments of the present disclosure.

FIG. 21 illustrates an example RRC, MAC-CE, and DCI 2100 according to embodiments of the present disclosure. An embodiment of the RRC, MAC-CE, and DCI 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

To employ refined (narrow) beams for spatial multiplexing and increasing coverage, while keeping RRC configuration efficient and limit overhead of pilots, it may be desirable to configure a limited set of Aperiodic CSI-RS resources (AP CSI-RS) at the UE. The AP CSI-RS resources are dynamically triggered and used for refining either the network (TX) beams or UE (RX) beams. The network may be able to flexibly use the same set of AP CSI-RS resources (resource elements, antenna ports etc.) to pool different sets of refined beams as a function of which coarse beam's angular coverage maximally covers the UE at any given point in time. To do so, the network may be able to indicate to the UE in a flexible and dynamic manner, the QCL relation between a set of dynamically triggered RS (AP CSI-RS) and a periodic RS.

For example, if the UE has two activated Periodic CSI-RS resources (P CSI-RS 1 and P CSI-RS 2) each covering a 120 degree in the azimuthal domain and suppose the network configures the UE with one AP CSI-RS set (e.g. the set could consists of 8 beams each covering 15 degrees). The network could dynamically convey QCL association between AP CSI-RS and P CSI-RS 1, so that the UE applies the spatial filter used to receive P CSI-RS1 to also receive AP-CSI-RS and determine the strongest refined beam within the angular coverage of P CSI-RS 1. At a different point in time, the network would choose to indicate QCL association between AP CSI-RS with P CSI-RS 2, if the UE subsequently moves to within angular coverage of P CSI-RS 2 and the network wants to refine the network's transmitted beams in the direction of P CSI-RS 2.

The network can dynamically and flexibly vary the linkage between AP CSI-RS and P/SP CSI-RS used for PDSCH reception through either explicit (e.g. via MAC-CE signaling) or implicitly. In one explicit method, a MAC-CE indicates QCL between a set of AP CSI-RS resource and a P/SP CSI-RS resource. This indication conveys two sets of information to the UE. First, the UE may assume that the receive beam applied on the activated P/SP CSI-RS resource can be used either as is, or refined further (during receive beam sweep), while receiving AP CSI-RS. Second, the UE may assume that the receive beam applied at the UE during reception of that AP CSI-RS resource can also be used to receive the PDSCH which uses the P/SP CSI-RS resource as a QCL reference. The UE may consider it an error case if the MAC-CE signaling indicates QCL between an AP CSI-RS resource and a de-activated P/SP CSI-RS resource.

As an alternative to explicit signaling, it is beneficial to define implicit QCL relation for PDSCH reception which can reduce QCL signaling overhead. In particular, implicit QCL relation can be used to avoid the need for semi-static QCL configuration for a certain CSI-RS such aperiodic CSI-RS that is used for Tx or Rx beam refinement. In other words, dynamic QCL relation, via implicit signaling, is motivated for efficiently indicating to the UE what spatial receive filter (beam) the UE may apply in order to receive a certain CSI-RS such as aperiodic CSI-RS. Suppose RRC signaling configures an aperiodic CSI-RS resource. If the DM-RS of a PDCCH (or CORESET) is configured with a QCL reference of a UE-specific CSI-RS, and the PDCCH is used to trigger an aperiodic CSI-RS that is used for TX refinement (e.g. CSI-RS with sub-time unit), the aperiodic CSI-RS is assumed to be QCL-ed with the UE-specific CSI-RS (QCL reference of the PDCCH).

Likewise, if a second PDCCH triggers the same aperiodic CSI-RS, the aperiodic CSI-RS is assumed to be QCL-ed with the QCL reference of the second PDCCH. The aperiodic CSI-RS resource configuration for Tx and/or Rx beam refinement does not include QCL information. If QCL information is included in the aperiodic CSI-RS resource configuration, it can be overridden by the aforementioned procedure.

Figure 22:
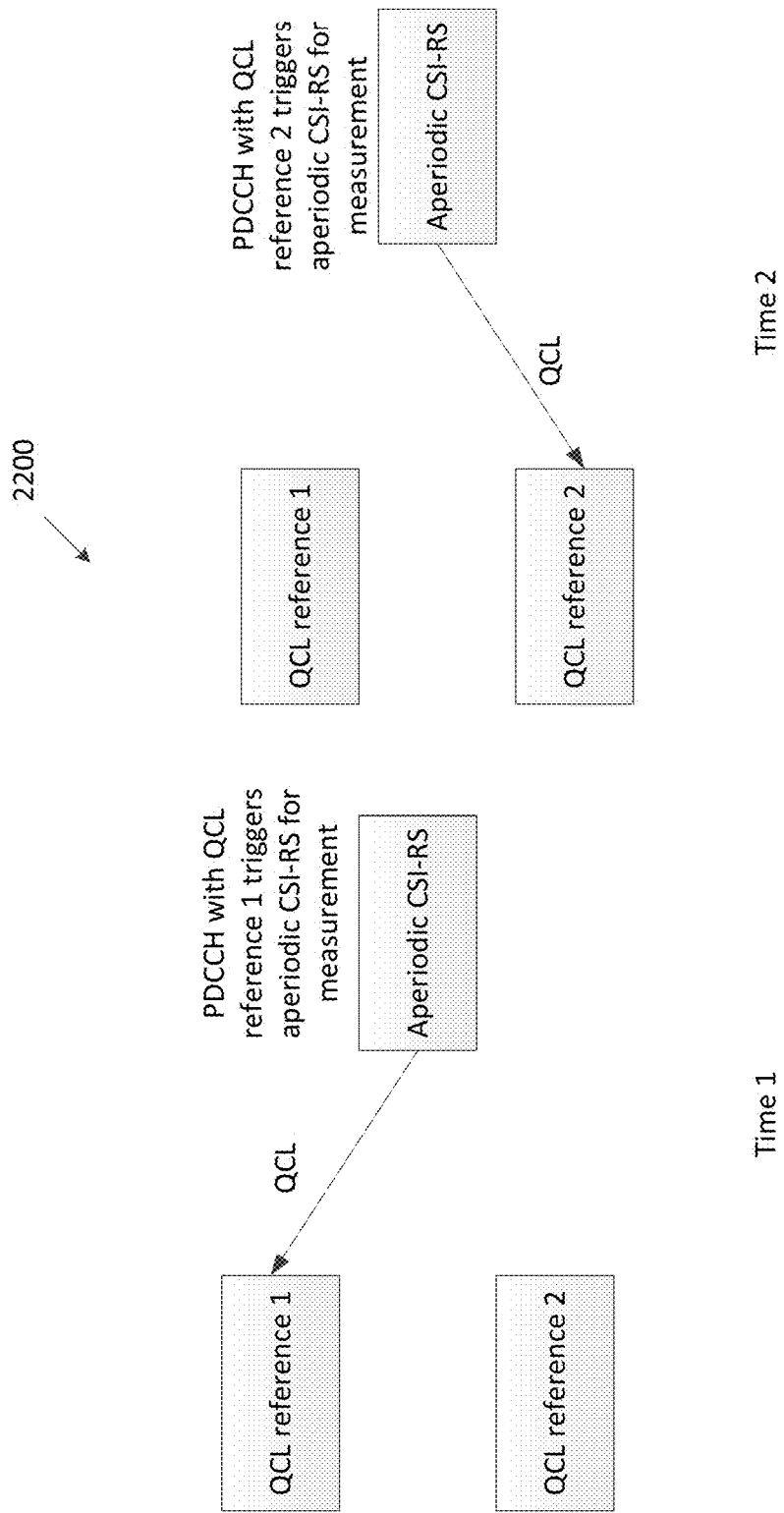
FIG. 22 illustrates an example QCL reference and CSI-RS according to embodiments of the present disclosure.

FIG. 22 illustrates an example QCL reference and CSI-RS 2200 according to embodiments of the present disclosure. An embodiment of the QCL reference and CSI-RS 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

When the aperiodic CSI-RS triggered by a PDCCH is used for UE Rx beam refinement, the UE assumes PDSCH DM-RS that shares the same QCL reference with the PDCCH triggering the aperiodic CSI-RS has the same spatial QCL with the aperiodic CSI-RS (i.e. the UE may use the same refined Rx beam to receive the PDSCH that shares the same QCL reference with the PDCCH). The PDSCH DM-RS can be determined to share the same QCL reference as the PDCCH that triggers the aperiodic CSI-RS through explicit signaling in the DCI that schedules the PDSCH, or through implicit indication (e.g. the PDSCH is assumed to share the same QCL reference as the corresponding PDCCH that performs the DL assignment.

If the DL assignment PDCCH also shares the same QCL reference as the PDCCH that triggers the aperiodic CSI-RS, then the PDSCH is assumed to be QCL-ed with the aperiodic CSI-RS, including the spatial QCL). Further details of implicit indication methods of the UE Rx beam are described here. Suppose QCL association is configured between a periodic/semi-persistent CSI-RS and an aperiodic CSI-RS. Further suppose the Rx beam before the P3 procedure is Rx beam 1, and Rx beam 2 is the outcome of the P3 procedure triggered by an aperiodic CSI-RS, the following alternatives for implicit indication of the UE Rx beam can be considered. In one example, Rx beam 2 is associated with the NR-PDSCH assigned by a NR-PDCCH with Rx beam 1. In another example, if the QCL reference indicated in the NR-PDCCH assigning the NR-PDSCH is the periodic/semi-persistent CSI-RS, then Rx beam 1 may be used; else if the QCL reference indicated is the aperiodic CSI-RS, then Rx beam 2 may be used.

In one example of the implicit indication method, suppose the network sends a PDCCH triggering UE Rx refinement procedure by triggering an aperiodic CSI-RS in time n, the UE performs Rx beam refinement and determines the best refined Rx beam. In time m>n, the network sends a PDCCH with DL assignment (DL data in PDSCH), whereby the DL assignment PDCCH has the same QCL reference as the PDCCH triggering the aperiodic CSI-RS previously, then the UE assumes the same refined Rx for receiving the PDSCH.

The above schemes of implicit QCL reference indication of PDSCH (wrt to a refined beam, represented by beam used for aperiodic CSI-RS) can be extended the case the PDCCH triggering the aperiodic CSI-RS and/or the PDCCH assigning the PDSCH, includes a QCL reference. In particular, suppose the PDCCH triggering the aperiodic CSI-RS includes a QCL reference for the aperiodic CSI-RS, which can be different than the beam used for the PDCCH trigger, in time n. The UE performs Rx beam refinement and determines the best refined Rx beam (using the baseline Rx beam corresponding to the indicated QCL reference for refinement). In time m>n, the network sends a PDCCH with DL assignment (DL data in PDSCH), which includes a QCL reference indicator which points to the same QCL reference as the aperiodic CSI-RS previously, then the UE assumes the same refined Rx for receiving the PDSCH.

Hybrid beam indication approaches, involving a mix of explicit and implicit indication methods, are also possible. As an example, suppose the PDCCH with DL assignment includes a QCL reference indicator which can take a set S containing M possible values. The network signals to the UE two set partitions S1 and S2 of S. When the UE detects a DL DCI containing a DL assignment, if the QCL reference indicator belongs to S1, the UE receives PDSCH using the same rx beam used for receiving P/SP/AP CSI-RS associated to that QCL reference indicator.

If the QCL reference indicator belongs to S2, higher-layers inform the UE which RX beam to apply for that indicator, or what behavior the UE may apply for determining the UE's RX beam for that indicator, in order to receive the scheduled PDSCH. In one embodiment, for example, a certain entry in S2, say L, could correspond to the UE applying the QCL reference for the PDSCH to be identical as the scheduling PDCCH on which the DL assignment is received. That is, if the QCL reference indicator in the scheduling DCI equals L, the UE is expected to receive the UE's scheduled PDSCH using the same RX beam as it used to receive the scheduling PDCCH.

Alternative approaches not involving higher layer signaling are also possible. For example, if the UE detects a DCI containing a DL assignment at time m, if QCL reference indicator in that DCI equals a reserved value "00," the UE is expected to receives the UE's PDSCH using the same receive beam as that corresponding to the scheduling PDCCH. For all other values of the QCL reference indicator, the UE uses the RX beam as that used most recently at time n<m to receive the RS (P/SP/AP CSI-RS) associated to that QCL reference indicator.

In some embodiments, a UE may be RRC configured with multiple resource settings, where each of these resource settings comprises SS blocks or CSI-RS resources (which can be P CSI-RS resources, SP CSI-RS resources or AP CSI-RS resources). In one embodiment of Step 1, a mapping table from each QRI (QCL reference indicator) states to resource setting indices that are possible QCL references is indicated in the RRC. TABLE 1A illustrates examples of mapping QRI states to resource setting indices.

The TABLE 1A shows how four QRI states are mapped to resource setting indices. In one example 1, $1^{st}$ and $2^{nd}$ states are mapped to resource setting 0, and $3^{rd}$ and $4^{th}$ states are mapped to resource setting 1. In example 2, $1^{st}$ state is mapped to resource setting 0, $2^{nd}$ and $3^{rd}$ states are mapped to resource setting 1, and the $4^{th}$ state is mapped to resource setting 2. Other examples can be similarly constructed. A list of parameters corresponding to these states can be configured in RRC, and the parameters may have an integer value indicating the resource setting index. The list of parameters is referred to as a first, a second, a third and a fourth index configured by RRC in TABLE 1A. Alternatively, the RRC signaling may indicate a set of QRI states to associate with each configured resource setting index.

TABLE 1A

Mapping QRI states

| QRI States | Resource setting index | Resource setting index (Example 1) | Resource setting index (Example 2) |
|---|---|---|---|
| $1^{st}$ state | A first resource setting configured by RRC | 0 | 0 |
| $2^{nd}$ state | A second resource setting configured by RRC | 0 | 1 |
| $3^{rd}$ state | A third resource setting configured by RRC | 1 | 1 |
| $4^{th}$ state | A fourth resource setting configured by RRC | 1 | 2 |
| ... | ... | ... | ... |

Then, in one embodiment of Step 2, the MAC CE signaling further indicates the beam index (e.g., CRI or SS block index) corresponding to each QRI state. The beam indices are defined with respect to each resource setting. Following up with Example 1 in TABLE 1A, the N1 beams corresponding to resource setting 1 have beam indices of 0, 1, ..., N1-1; and the N2 beams corresponding to resource setting 2 have beam indices of 0, 1, ..., N2-1. Based on the beam reports, the network decides to use beam indices 2 and 4 for setting 0, and beam indices 1 and 10 for setting 1 as beam candidates for PDSCH and beam refinement CSI-RS (AP-CSI-RS).

Then, the MAC CE signaling indicates this information on top of the RRC configured TABLE 1B. In an alternative procedure, the beam indices in TABLE 1B are configured together with resource setting indices during Step 1; and the updated beam indices are configured during Step 2.

The pool of beam indices to be used for the MAC CE indication for a QRI state corresponding to a resource setting is a set of activated resources in the resource setting or in activated resource sets of the resource setting. In one example, suppose that resource setting 0 has 64 resources; and MAC CE signaling have activated a resource set comprising 8 resources (e.g., resources 0-7) only and the rest of the resources in the resource setting are deactivated.

Then, the pool of beam indices may be CRI 0-7. The MAC CE signaling to indicate a beam index for the $1^{st}$ QRI state has a 3 bit field of indicating a resource selected from the activated resources (i.e., resources 0-7). The MAC CE signaling may comprise: a [2]-bit field to indicate a resource setting index, assuming that up to [4] resource settings can be configured; a [3]-bit field to indicate a first CRI out of the pool of resources, assuming that up to [8] resources can be activated per resource setting; and a [3]-bit field to indicate a second CRI out of the pool of resources, assuming that up to [8] resources can be activated per resource setting. This second field is useful for non-coherent JT, and may be active only when non-coherent JT transmission/feedback is configured.

TABLE 1B

Mapping QRI states

| QRI States | Resource setting index (Example 1) | Beam indices (MAC-CE indicated) |
|---|---|---|
| $1^{st}$ state | 0 | 2 |
| $2^{nd}$ state | 0 | 4 |
| $3^{rd}$ state | 1 | 1 |
| $4^{th}$ state | 1 | 10 |
| ... | ... | ... |

Given that TABLE 1B is constructed, the QRI can be used in a DL DCI for indicating a pair of (resource setting index, beam index) to be used as a QCL reference for PDSCH reception. The QRI can also be used in a UL DCI for indicating a pair of (resource setting index, beam index) to be used as a QCL reference for AP CSI-RS reception for the AP CSI/BSI reporting.

A QRI state may be associated with a plurality of pairs of (resource setting index, beam index) when supporting NC-JT, with DMRS grouping. Upon indicated with a QRI state, the UE may assume that a first DMRS group is QCL'ed with the CSI-RS or SS block corresponding to a first pair; and a second DMRS group is QCL'ed with the CSI-RS or SS block corresponding to a second pair. In the aforementioned embodiments above, "resource setting" can be replaced with "resource set."

Figure 23:
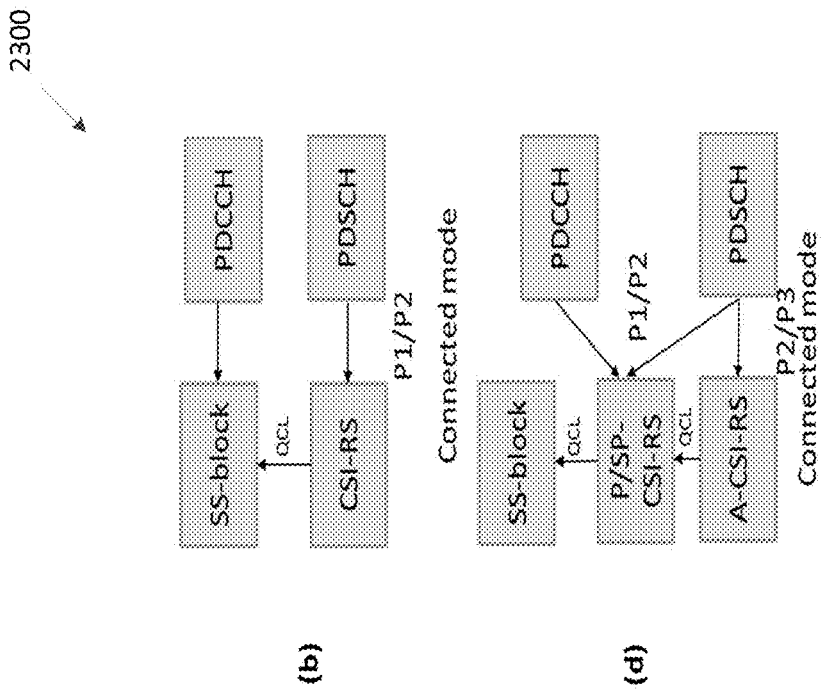
FIG. 23 illustrates an example QCL association between beam management RS according to embodiments of the present disclosure.
Figure 23:
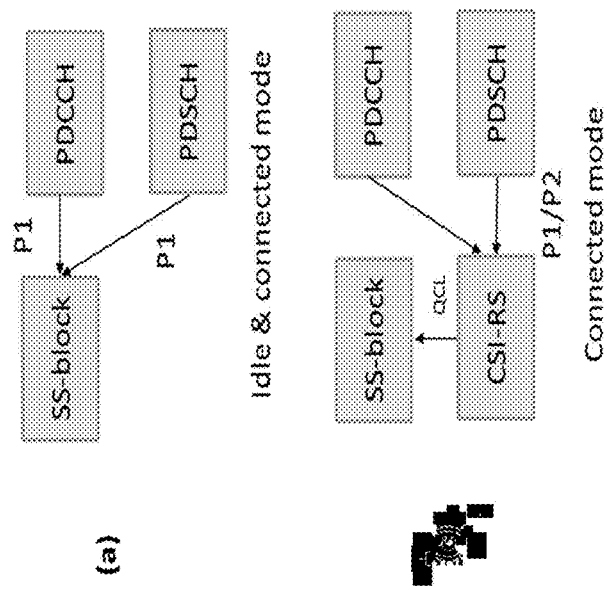

FIG. 23 illustrates an example QCL association 2300 between beam management RS according to embodiments of the present disclosure. An embodiment of the QCL association 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

An overview of some example cases of QCL association configurations is illustrated in FIG. 23. Error! Reference source not found. The cases depicted here are not intended to be comprehensive. Combinations of the cases, different case for different UE in the same network, or switching of the cases for the same UE are also possible. In case a, only the SS-block is implicitly/explicitly configured as QCL reference by the network. NR-PDCCH and NR-PDSCH are only QCL-ed with the SS block. This case allows support of streamlined beam management procedure without the need for UE-specific CSI-RS configurations. This case is useful when the network or the UE does not need fine beam alignment required for high data rate transmission. It can also be useful with the SINR condition for the UE achievable with the SS block beam is already very high (e.g. it is close to the cell center with LOS).

In case b, both the SS-block and the CSI-RS are configured as QCL references by the network. NR-PDCCH is configured to be QCL-ed with the SS-block and the NR-PDSCH is configured to be QCL-ed with the CSI-RS. This case supports the scenario where the NR-PDCCH is transmitted on a coarse Tx beam, whereas the NR-PDSCH is transmitted on a fine Tx beam after a P2 procedure. In this case, the CSI-RS is configured to be QCL-ed with the SS-block. This case also supports the scenario where the NR-PDCCH and the NR-PDSCH are transmitted from different TRPs. In this case, the CSI-RS is configured to be QCL-ed with the SS-block corresponding to the separate TRP.

In case c, the CSI-RS is configured as the QCL reference by the network for both NR-PDCCH and NR-PDSCH. The CSI-RS is configured to be QCL-ed with the SS-block. This case enables both NR-PDCCH and NR-PDSCH to be QCL-ed with CSI-RS which can be transmitted on a different beam than that for the SS-block. The beam for CSI-RS can be narrower than that for the SS-block and hence can either support higher beamforming gain for higher spectral efficiency or support higher order MU-MIMO.

In case d, SS-block, periodic/semi-persistent CSI-RS, and aperiodic CSI-RS are configured as the QCL references by the network. The CSI-RS resources are configured to be QCL-ed with the SS-block. This case supports case (c) and in addition enables Tx and Rx beam refinement (P3 procedure) to be performed based on aperiodic CSI-RS resources. The NR-PDSCH can be received by the UE with the refined Tx and Rx beams. Explicit and implicit QCL association between RS resources is possible. Implicit QCL association can be considered at least for the following: If a NR-PDCCH that is QCL-ed with a RS resource triggers an aperiodic CSI-RS, the aperiodic CSI-RS is QCL-ed with the RS resource. Such implicit QCL association avoids the need for RRC configuration of the QCL relationship for the aperiodic CSI-RS and allows the aperiodic CSI-RS resource's QCL relation to be dynamically switched between the periodic or semi-persistent CSI-RS.

Certain common PDCCHs can be UE-group common in nature. In other words, the PDCCH targets a subset of UEs served by the TRP, rather than the all UEs served by the TRP. Examples of such common PDCCHs are PDCCH for scheduling random access responses (RAR), paging, or certain system information blocks (SIBs), PDCCH for transmit power control (TPC), PDCCH for triggering PRACH. It can be beneficial from the network's perspective if the network can identify the best Tx beam to transmit to a subset of UEs even for common PDCCHs, to improve the data rate or to increase reliability of transmission.

The network can also perform spatial division multiplexing on multiple subsets of UEs and transmit different data streams on different UE-group common PDCCHs. However, for certain common PDCCHs such as those corresponding to scheduling of SIB that contains essential system access information (analogous to SIB1 and SIB2 in LTE), they may be received by all UEs. Therefore, if the network wants to apply different transmission schemes to different set of common PDCCHs, there is a need for the UE to determine how the UE may receive the different set of common PDCCHs, e.g. in the form of beam management procedure. Determining the best/preferred Tx beam to receive a signal or channel means the UE can determine the DL RS that can be considered QCL-ed with the signal or the channel, and the Rx beam that the UE may use to receive the signal or the channel.

In one embodiment, the set of common PDCCHs whereby the beams to receive them is indicated by the network is predefined in the standards specifications. This reduces signaling overhead and simplifies UE procedure. In another method, the set of common PDCCHs whereby the beams to received is indicated by the network is configured by the network. This allows network flexibility to determine which set of common PDCCHs which it wants to apply specific transmission schemes, such as MU-MIMO and precoding.

In one example, a first beam for receiving a first set of common PDCCHs can be based on UE selection of the best or preferred Tx beam or cell-specific RS; whereas a second beam for receiving a second set of common PDCCHs can be based on network indication. The first set of common PDCCHs can be predefined in standards to be the PDCCHs for scheduling the system information blocks containing essential system information such as the system bandwidth, the PRACH resources, PLMD id, etc. It can also be configured by the network to include other common PDCCHs for TPC and for scheduling RAR and/or paging.

The first beam can be the same as the beam used for receiving NR PBCH. The second set of common PDCCHs can be predefined in standards to be TPC, or for scheduling RAR and/or paging or can be configured by the network to include one or more of the aforementioned common PDCCHs. For the PDCCH for paging, it can be specified that the UE use different beams or apply beam management procedure depending on whether it is in RRC connected more or not. When the UE is in idle mode, paging is received with the first beam; else paging is received with the second beam.

Figure 24:
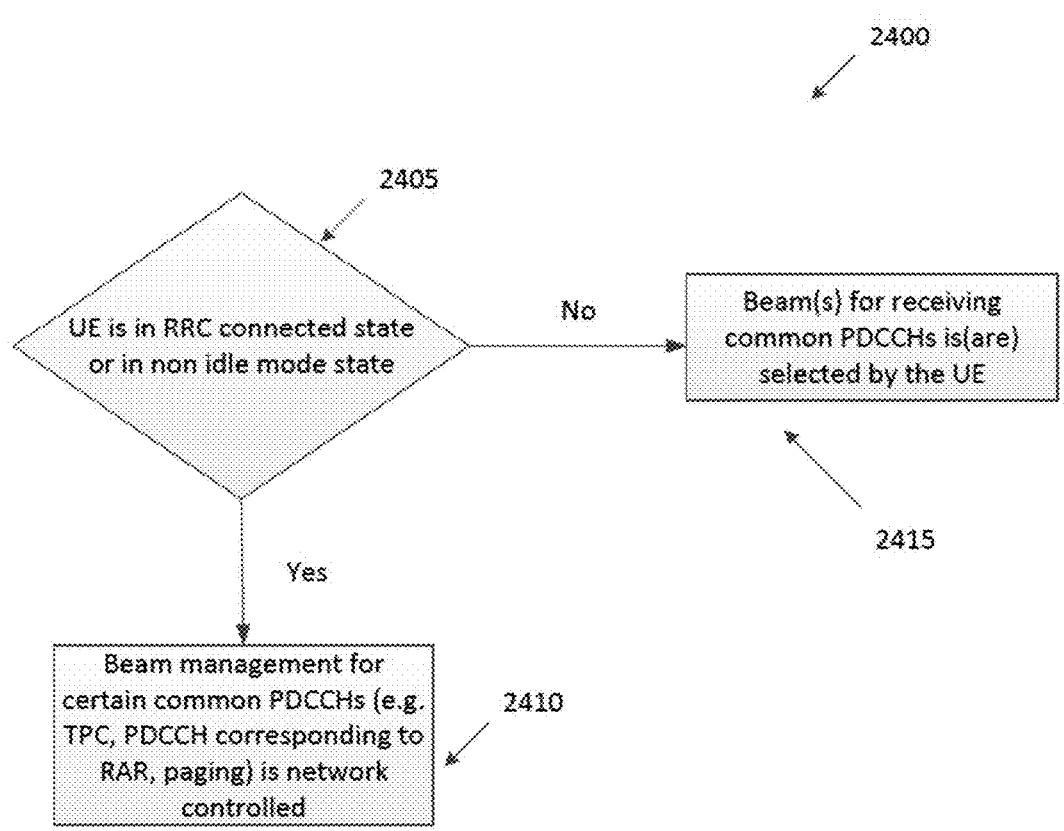
FIG. 24 illustrates an example UE procedure of determining beams for receiving common PDCCHs according to embodiments of the present disclosure.

FIG. 24 illustrates an example UE procedure 2400 of determining beams for receiving common PDCCHs according to embodiments of the present disclosure. An embodiment of the UE procedure 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

The procedure of determining beams to be used for receiving certain common PDCCHs can depend on whether the UE is in RRC connected state or in non-idle mode. This is illustrated in FIG. 24.

There can be a first CORESET that is configured for a UE in an idle mode and in connected mode through a broadcast message in a SIB. The common or UE-group common PDCCH or unicast PDCCH (and the corresponding PDSCH) associated with the first CORESET is assumed by the UE to be QCL-ed with the SS block (NR-SSS and/or PBCH DM-RS) that the UE selected for initial access and is in-sync with. A second CORESET can be configured for the UE in RRC connected mode or RRC in-active mode which includes the QCL information that indicates a RS resource set/resource/port ID (corresponding to a CSI-RS or a SS block) that the PDCCH associated with the $2^{nd}$ CORESET is QCL-ed with.

The PDCCH associated with the second CORESET can also be common, UE-group common or unicast PDCCH (differentiated e.g. by RNTI). In one embodiment, the CORESETs configured by a broadcast message (such as SIB) does not include QCL information explicitly and the CORSETs are assumed to be QCL-ed with the SS-block that the UE is synchronized with and receives the PBCH from. The CORESETs configured by UE-specific RRC message includes QCL information that indicates the identity of a CSI-RS or a SS block. In another embodiment, regardless of the UE RRC connected state, for a CORESET that does not include a QCL information, the SS block that the UE is synchronized with in an idle mode is assumed to be the QCL reference for the PDCCH in the CORESET, whereas for CORESET that does include a QCL information, the CSI-RS or the SS block indicated is the QCL reference for the PDCCH in the CORESET.

The UE can be configured to monitor multiple CORESETs for PDCCH reception. There is a QCL reference for each CORESET, which can be either explicitly configured by RRC as part of the CORESET configuration or implicitly determined. In order for the network to control the CORE- SETs that the UE may monitor, the network transmits a MAC CE signaling to the UE to indicate a subset of the CORESETs that are RRC configured to the UE. There can be an index associated with each CORESET that is RRC configured and the MAC CE signaling can indicate an index associated with the CORESET. Alternatively, the MAC CE signaling indicates the index of the RS that serves as the QCL reference. Several approaches of the MAC CE signaling are given below, where CORESET index is used as the example for beam indication.

The MAC CE signaling indicates one or more CORESETs that are activated, and one or more CORESETs that are deactivated. In one option, the MAC CE provides the indications for all CORESETs that have been configured by RRC; for example for each CORESET index there is one bit that indicates if the CORESET is activated or not. In another option, the state of the CORESET is not changed if it is not included in a MAC CE signaling. In another option, only the CORESETs that are activated are included in the MAC CE signaling, and those not included in the MAC CE signaling is assumed to be deactivated.

The beam indication procedure for PDCCH can be implemented as follows, where QCL signaling is assumed to be the realization of beam indication signaling. In step 1, RRC configures RS resource sets, resources and ports which are the possible QCL references for receiving data and/or control channels. In such step, the RS is CSI-RS and can also be a RS from SS block, such as NR SSS, NR PBCH DM-RS. In such step, the RRC signaling can be the same RRC signaling to configure the set of RS for CSI acquisition, or it can be separate RRC signaling. In such step, there is an index configured for each QCL reference.

In step 2, RRC configures CORESETs. Each CORESET configuration includes an index to a QCL reference. If the CORESET configuration does not include a QCL reference index, the SS block that the UE is in-sync with is the QCL reference. In one embodiment, a network may know what CORESET to assign, but not know which QCL reference index to set (until it pulls in a beam group report from the UE). There can be a need to define a procedure to update the QCL reference for a previously configured CORESET. In one approach, the following procedure can be defined: RRC configures CORESET(s). By default, UE assumes each CORESET is spatially QCL-ed with SS block; network collects measurements from the UE (e.g. via beam group reporting (measurement report containing measurement results from a group of beams or RS)); and the network sends a RRC reconfiguration to UE updating the QCL assumption for one or more CORESET.

In step 3, the set of CORESETs to be monitored by the UE is further down-selected by MAC CE signaling. The network can perform the down-selection with MAC CE signaling from measurement results reported by the UE. Hence the signaling effectively indicates the set of beam-pair links (BPLs). A BPL is formed by the UE through association of a RS it measures to the receive beam (also called UE Rx spatial QCL) that the UE uses to perform the measurement. In another method of updating the BPL or the QCL reference of a CORESET, the MAC CE signaling updates the BPL/QCL reference and the UE assumes the other higher configured CORESET information holds for PDCCH reception (e.g. the time-frequency resource allocation of CORESET to be monitored/received does not change with BPL update).

This is illustrated in TABLE 2 where it is shown that the CORESET with ID 1, 2, 3 have their BPL/QCL reference updated from CSI-RS resource 1, 2, 3 to CSI-RS resource 2, 1, 4, respectively. In the example of TABLE 2, it is assumed that a BPL/QCL reference can be represented by a CSI-RS resource index. In one embodiment of the above method of updating the BPL/QCL reference of a CORESET, the RS resources could be periodic/semi-persistent (e.g. P/SP CSI-RS or SS Block) in which case, the MAC CE signaling configuration may assign a CORESET with an activated resource.

If the MAC CE signaling assigns the CORESET with a de-activated resource, the UE could treat it as an error case. In another embodiment the CORESET indication could point to an aperiodic resource (e.g. AP CSI-RS), in case the network has already indicated to the UE the QCL relation between that aperiodic resource and a P/SP CSI-RS or SS Block.

TABLE 2

Example of MAC CE updating the BPL/QCL reference of CORESETs

| CORESET ID | BPL/QCL reference before MAC CE signaling | BPL/QCL reference after MAC CE signaling |
|---|---|---|
| 1 | CSI-RS resource 1 | CSI-RS resource 2 |
| 2 | CSI-RS resource 2 | CSI-RS resource 1 |
| 3 | CSI-RS resource 3 | CSI-RS resource 4 |

Figure 25:
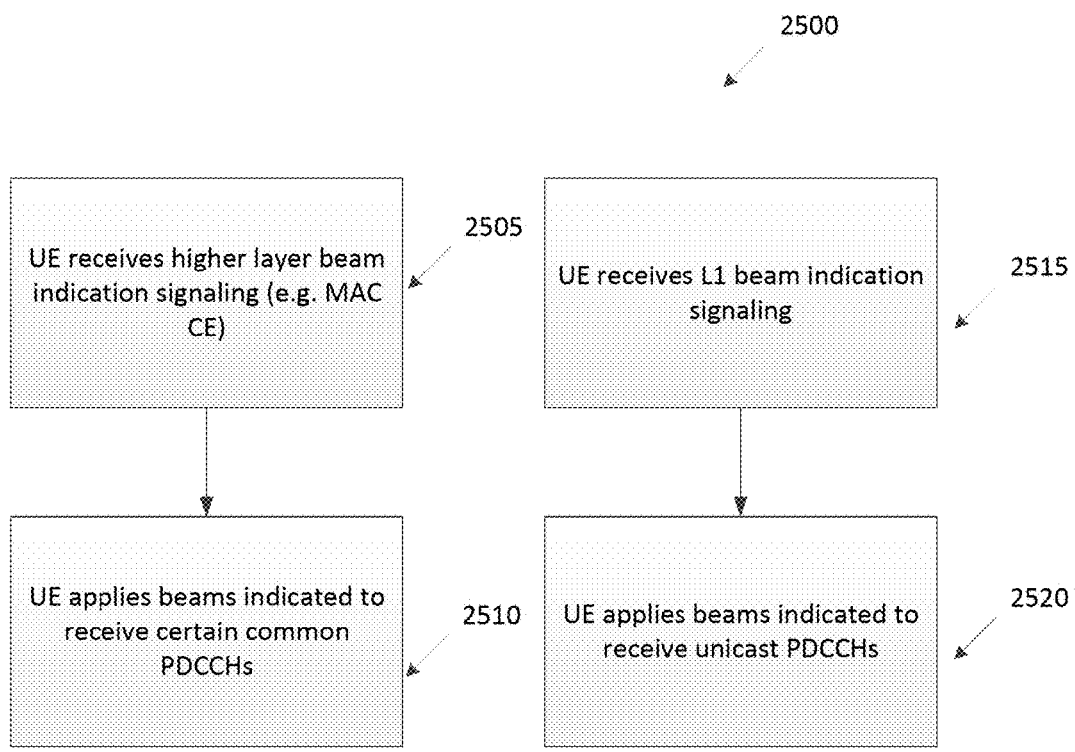
FIG. 25 illustrates an example UE procedure for determining the control signaling method depending on the PDCCH type according to embodiments of the present disclosure.

FIG. 25 illustrates an example UE procedure 2500 for determining the control signaling method depending on the PDCCH type according to embodiments of the present disclosure. An embodiment of the UE procedure 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

Figure 26:
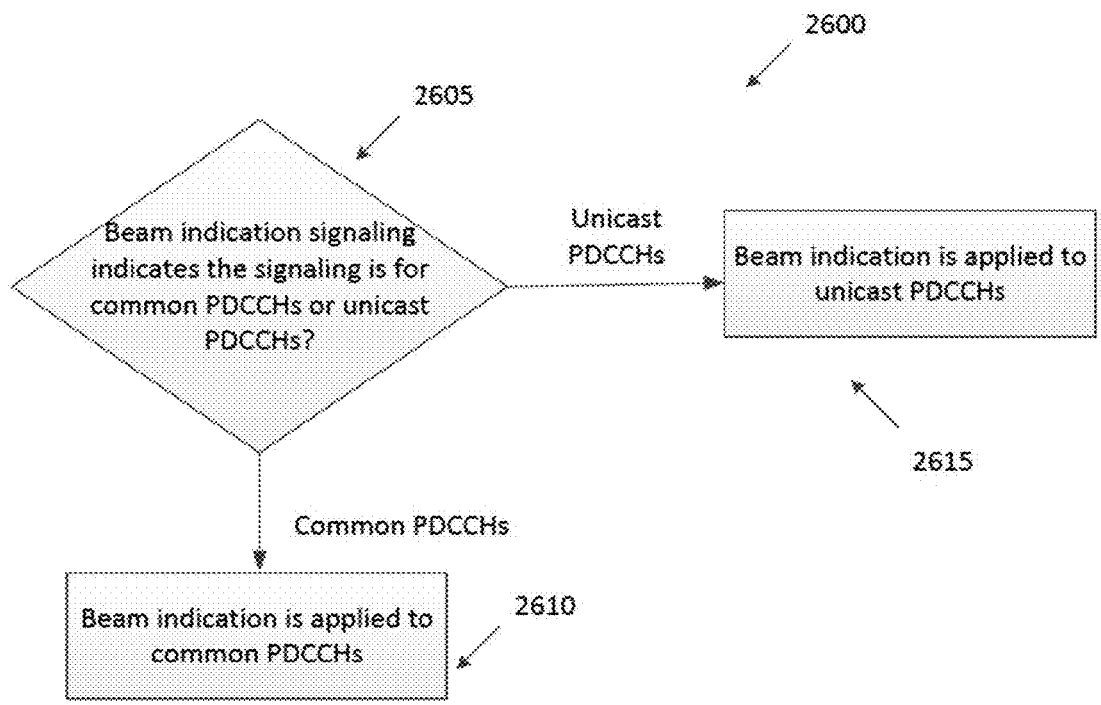
FIG. 26 illustrates an example UE procedure for determining the PDCCH type associated with the beam indication signaling according to embodiments of the present disclosure.

FIG. 26 illustrates an example UE procedure 2600 for determining the PDCCH type associated with the beam indication signaling according to embodiments of the present disclosure. An embodiment of the UE procedure 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

Due to the different attributes associated with each signaling method, different signaling method can be used for beam indication for different PDCCH types.

In one embodiment, a higher layer based beam indication signaling (e.g. MAC CE) is used for receiving common PDCCHs (or a subset of common PDCCHs); whereas L1 based beam indication signaling (with PDCCH) is used for receiving unicast PDCCHs. The procedures are illustrated in FIG. 25(a) and FIG. 25(b). Whether a PDCCH is common or unicast is distinguished with the RNTI type that is associated with the PDCCHs (e.g. the RNTI is used to scramble the CRC of PDCCH).

In another embodiment, the same signaling method is used for both common PDCCH and unicast PDCCH, but the signaling carries an indication information to indicate if the signaling is applied to common PDCCHs (or the configured common PDCCHs) or the unicast PDCCHs. An example of the indication information can be an explicit bit field in the signaling. This is illustrated in FIG. 26.

An error event of PDCCH beam indication is when the beam/BPL indication signaling is received by the UE but the acknowledgement (HARQ-ACK) of the reception fails to be received by the gNB. As a result, the UE changes the UE's BPL for a CORESET according to the received signaling but the gNB is unaware this and connectivity can be lost.

In one embodiment, the UE has a timer which starts when it gets a BPL indication. If the UE does not receive a PDCCH on the new BPL before the timer expires, it may assume that the previous BPL is still active. The timer duration can be predefined, higher layer configured or implicitly derived from other system parameters such as the PDCCH/CORESET monitoring period (e.g. an integer multiple of the configured PDCCH/CORESET monitoring period). In this way, the UE's connectivity can be restored quickly.

In another embodiment, after the network determines that the beam indication error event may have occurred, e.g. by not detecting the HARQ-ACK, the network can transmit PDCCH/PDSCH on the new BPL and also transmit the BPL indication signaling or a PDCCH/PDSCH on the old BPL, and then monitor the response from the UE to determine which BPL the UE is currently assuming.

In NR, beam management is defined as follows: beam management for a set of L1/L2 procedures to acquire and maintain a set of TRP(s) and/or UE beams that can be used for DL and UL transmission/reception, which include at least following aspects; beam determination for TRP(s) or UE to select of the UE own Tx/Rx beam(s); beam measurement for TRP(s) or UE to measure characteristics of received beamformed signals; beam reporting for UE to report information a property/quality of beamformed signal (s) based on beam measurement; beam sweeping for operation of covering a spatial area, with beams transmitted and/or received during a time interval in a predetermined way.

Also, the followings are defined as Tx/Rx beam correspondence at TRP and UE. Tx/Rx beam correspondence at TRP holds if at least one of the following is satisfied: TRP is able to determine a TRP Rx beam for the uplink reception based on UE's downlink measurement on TRP's one or more Tx beams; TRP is able to determine a TRP Tx beam for the downlink transmission based on TRP's uplink measurement on TRP's one or more Rx beams; Tx/Rx beam correspondence at UE holds if at least one of the following is satisfied; a UE is able to determine a UE Tx beam for the uplink transmission based on UE's downlink measurement on UE's one or more Rx beams; a UE is able to determine a UE Rx beam for the downlink reception based on TRP's indication based on uplink measurement on UE's one or more Tx beams; and capability indication of UE beam correspondence related information to TRP is supported.

Note that definition/terminology of Tx/Rx beam correspondence is for convenience of discussion. The detailed performance conditions are up to RAN4. The following DL L1/L2 beam management procedures are supported within one or multiple TRPs: P-1 is used to enable UE measurement on different TRP Tx beams to support selection of TRP Tx beams/UE Rx beam(s); for beamforming at TRP, it typically includes an intra/inter-TRP Tx beam sweep from a set of different beams. For beamforming at UE, it typically includes a UE Rx beam sweep from a set of different beams; P-2 is used to enable UE measurement on different TRP Tx beams to possibly change inter/intra-TRP Tx beam(s); from a possibly smaller set of beams for beam refinement than in P-1. Note that P-2 can be a special case of P-1; and P-3: is used to enable UE measurement on the same TRP Tx beam to change UE Rx beam in the case UE uses beamforming.

At least network triggered aperiodic beam reporting is supported under P-1, P-2, and P-3 related operations. A UE measurement based on RS for beam management (at least CSI-RS) is composed of K (=total number of configured beams) beams, and the UE reports measurement results of L selected Tx beams, where L is not necessarily fixed number. Note that the procedure based on RS for mobility purpose is not precluded. Reporting information at least include measurement quantities for L beam (s) and information indicating L DL Tx beam(s), if L<K. Specifically, when a UE is configured with $K'>1$ non-zero power (NZP) CSI-RS resources, a UE can report a set of L UE-selected CSI-RS-resource-related indices.

A UE can be configured with the following high layer parameters for beam management: $N\geq 1$ reporting settings, $M\geq 1$ resource settings; the links between reporting settings and resource settings are configured in the agreed CSI measurement setting (CSI-RS based P-1 & P-2 are supported with resource and reporting settings); P-3 can be supported with or without reporting setting; a reporting setting at least including (1) information indicating selected beam(s), (2) L1 measurement reporting, (3) Time-domain behavior: e.g. aperiodic, periodic, semi-persistent, and (4) frequency-granularity if multiple frequency granularities are supported; and a resource setting at least including (1) time-domain behavior: e.g. aperiodic, periodic, semi-persistent, (2) RS type: NZP CSI-RS at least, (3) At least one CSI-RS resource set, with each CSI-RS resource set having $K\geq 1$ CSI-RS resources, and (4) some parameters of K CSI-RS resources can be the same, e.g. port number, time-domain behavior, density and periodicity if any At least one of these two alternatives of beam reporting is supported. In one example of Alt 1, a UE reports information about TRP Tx Beam(s) that can be received using selected UE Rx beam set(s) where a Rx beam set refers to a set of UE Rx beams that are used for receiving a DL signal. Note that it is UE implementation issues on how to construct the Rx beam set. One example is that each of Rx beam in a UE Rx beam set corresponds to a selected Rx beam in each panel. For UEs with more than one UE Rx beam sets, the UE can report TRP Tx Beam(s) and an identifier of the associated UE Rx beam set per reported TX beam(s). In such example, different TRP Tx beams reported for the same Rx beam set can be received simultaneously at the UE. In such example, different TRP TX beams reported for different UE Rx beam set may not be possible to be received simultaneously at the UE.

In another example of Alt 2, a UE reports information about TRP Tx Beam(s) per UE antenna group basis where UE antenna group refers to receive UE antenna panel or subarray. For UEs with more than one UE antenna group, the UE can report TRP Tx Beam(s) and an identifier of the associated UE antenna group per reported TX beam. In such example, different TX beams reported for different antenna groups can be received simultaneously at the UE. In such example, Different TX beams reported for the same UE antenna group may not be possible to be received simultaneously at the UE.

An NR also supports the following beam reporting considering Q groups where Q>=1 and each group refers to an Rx beam set (Alt1) or a UE antenna group (Alt2) depending on which alternative is adopted. For each group q, UE reports at least the following information: information indicating group at least for some cases; measurement quantities for Lq beam (s); support L1 RSRP and CSI report (when CSI-RS is for CSI acquisition); and information indicating Lq DL Tx beam(s) when applicable.

This group based beam reporting is configurable per UE basis. This group based beam reporting can be turned off per UE basis e.g., when Q=1 or Lq=1. Note that no group identifier is reported when it is turned off.

An NR supports that UE can trigger mechanism to recover from beam failure. Beam failure event occurs when the quality of beam pair link(s) of an associated control channel falls low enough (e.g. comparison with a threshold, time-out of an associated timer). Mechanism to recover from beam failure is triggered when beam failure occurs. Note that here the beam pair link is used for convenience, and may or may not be used in specification. Network explicitly configures to UE with resources for UL transmission of signals for recovery purpose. Configurations of resources are supported where the base station is listening from all or partial directions, e.g., random access region.

The UL transmission/resources to report beam failure can be located in the same time instance as PRACH (resources orthogonal to PRACH resources) or at a time instance (configurable for a UE) different from PRACH. Transmission of DL signal is supported for allowing the UE to monitor the beams for identifying new potential beams.

An NR supports beam management with and without beam-related indication. When beam-related indication is provided, information pertaining to UE-side beamforming/receiving procedure used for CSI-RS-based measurement can be indicated through QCL to UE. NR supports using the same or different beams on control channel and the corresponding data channel transmissions.

For NR-PDCCH transmission supporting robustness against beam pair link blocking, a UE can be configured to monitor NR-PDCCH on R beam pair links simultaneously, where R≥1 and the maximum value of R may depend at least on UE capability. A UE can be configured to monitor NR-PDCCH on different beam pair link(s) in different NR-PDCCH OFDM symbols. Parameters related to UE Rx beam setting for monitoring NR-PDCCH on multiple beam pair links are configured by higher layer signaling or MAC CE and/or considered in the search space design. At least, NR supports indication of spatial QCL assumption between a DL RS antenna port(s), and DL RS antenna port(s) for demodulation of DL control channel. Candidate signaling methods for beam indication for a NR-PDCCH (i.e. configuration method to monitor NR-PDCCH) are MAC CE signaling, RRC signaling, DCI signaling, specification-transparent and/or implicit method, and combination of these signaling methods. Note that indication may not be needed for some cases.

A beam pair link is represented by a pair of Tx beam and Rx beam (e.g. pair of Tx beam ID and Rx beam ID). If UE doesn't perform Rx beamforming, then a beam pair link can be simply represented by the Tx beam (Tx beam ID). The Tx beams or the corresponding RS resources/ports that can be indicated in the beam indication signaling is one or more of the RS resources/ports belonging to the M resource settings.

For reception of unicast DL data channel DL data channel, NR supports indication of spatial QCL assumption between DL RS antenna port(s) and DMRS antenna port(s) of DL data channel. Information indicating the RS antenna port(s) is indicated via DCI (downlink grants). The information indicates the RS antenna port(s) which is QCL-ed with DMRS antenna port(s). Different set of DMRS antenna port(s) for the DL data channel can be indicated as QCL with different set of RS antenna port(s). Note that indication may not be needed for some cases.

NR supports periodic, aperiodic, and semi-persistent transmissions of CSI-RS as follows: semi-persistent transmission; activation(s)/de-activation(s) of CSI-RS resource is triggered dynamically; preconfigured CSI-RS resources can be activated or de-activated; periodic transmission; periodic transmission can be configured by higher layer signaling; and periodic CSI-RS transmissions are semi-statically configured/re-configured.

NR CSI-RS pattern with at least the following properties is supported. CSI-RS mapped in one or multiple symbols. The following configurations of NR CSI-RS are supported: UE-specific configuration to support; wideband CSI-RS, i.e. from UE perspective, the full bandwidth the UE is configured to operate with; and partial-band CSI-RS, i.e. from UE perspective, part of the bandwidth the UE is configured to operate with.

CSI-RS configuration for NR also includes at least "number of antenna ports." Configuration can be explicit or implicit. The number of CSI-RS antenna ports can be independently configured for periodic/semi-persistent CSI reporting and aperiodic CSI reporting. A UE can be configured with a CSI-RS resource configuration with at up to at least 32 ports. UE is configured by RRC signaling with one or more CSI-RS resource sets and CSI-RS resources is dynamically allocated from the one or more sets to one or more users. Allocation can be aperiodic (single-shot) and can be on a semi-persistent basis. Note that semi-persistent CSI-RS transmission is periodic while allocated.

CSI-RS supports the downlink Tx beam sweeping and UE Rx beam sweeping. Note that CSI-RS can be used in P1, P2, and P3. NR CSI-RS supports the following mapping structure: NP CSI-RS port(s) can be mapped per (sub)time unit; across (sub)time units, same CSI-RS antenna ports can be mapped; each time unit can be partitioned into sub-time units; and mapping structure can be used for supporting multiple panels/Tx chains.

For beam management overhead and latency reduction, NR also considers beam sweeping for CSI-RS within an OFDM symbol. Note that the symbol duration is based on reference numerology.

NZP CSI-RS resource is defined in NR, as a set of NZP CSI-RS port(s) mapped to a set of REs within a frequency span/a time duration which can be measured at least to derive a CSI. Multiple NZP CSI-RS resources can be configured to UE at least for supporting CoMP and multiple beamformed CSI-RS based operations, where each NZP CSI-RS resource at least for CoMP can have different number of CSI-RS ports.

The RE pattern for an X-port CSI-RS resource spans N≥1 OFDM symbols in the same slot and is comprised of one or multiple component CSI-RS RE patterns where a component CSI-RS RE pattern is defined within a single PRB as Y adjacent REs in the frequency domain and Z adjacent REs in the time domain. Note that, depending on the density reduction approach, the Y REs of a component CSI-RS RE pattern may be non-adjacent in the frequency domain. The multiple component CSI-RS RE patterns can be extended across the frequency domain within the configured CSI-RS bandwidth. At least, the numbers of OFDM symbols for a CSI-RS resource, N={1, 2, 4}, are supported. The N OFDM symbols can be adjacent/non-adjacent. OFDM symbol(s) can be configured to contain CSI-RS only. Density per port in terms of RE per port per PRB is configurable.

Some embodiments of the present disclosure are described assuming cellular DL communications. However, the same/similar principles and related signaling methods & configurations can also be used for cellular UL & sidelink (SL) communications.

As the aforementioned embodiments, a UE can be configured with the following high layer parameters for beam management: N≥1 reporting settings, M resource settings. The links between reporting settings and resource settings are configured in a CSI measurement setting. CSI-RS based P-1 & P-2 are supported with resource and reporting settings.

Figure 27:
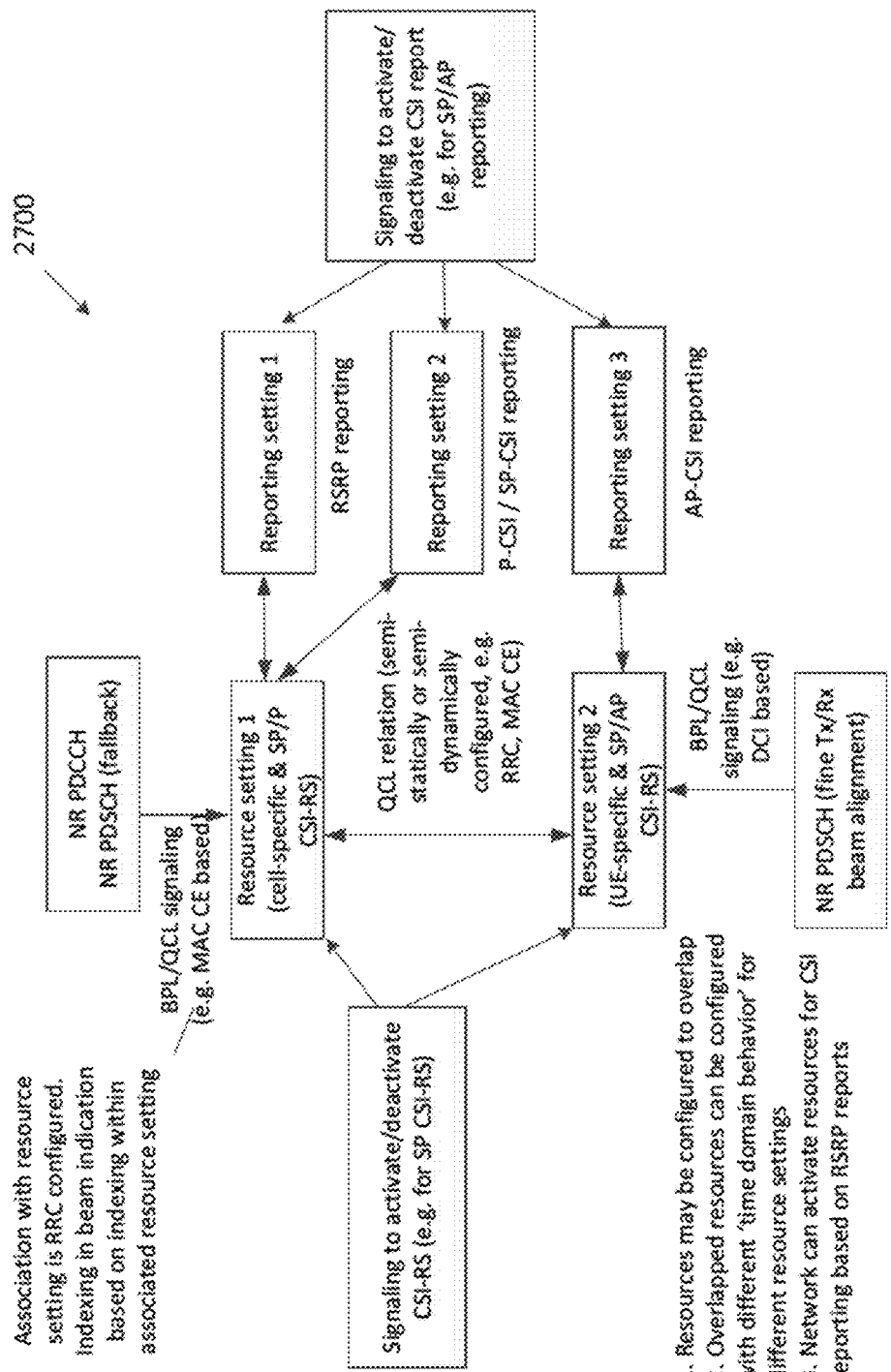
FIG. 27 illustrates an example configuration for beam management, CSI measurement and reporting and QCL indication according to embodiments of the present disclosure.

FIG. 27 illustrates an example configuration 2700 for beam management, CSI measurement and reporting and QCL indication according to embodiments of the present disclosure. An embodiment of the configuration 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

FIG. 27 illustrates an example of the configurations to facilitate operations for beam management, CSI measurement/reporting and QCL indication.

The beam indication signaling for NR PDCCH indicates one or more beams or beam pair links (R) to be monitored by the UE for NR PDCCH. The UE may monitor the NR PDCCHs on the indicated R beam pair links. Monitoring of NR PDCCHs involves the UE attempting to decode NR PDCCHs on the time-frequency resources (or search space) corresponding to the indicated beam pair links. The R beam pair links that can be indicated by the beam indication signaling may be selected from those with corresponding Tx beams or RS resources/ports (e.g. CSI-RS, NR SS) from one or more of the M resource settings configured. It may be referred to the R beam pair links indicated for NR PDCCH monitoring as "active" or "activated" or "serving" beam pair links and those that are included in the beam indication signaling as "inactive" or "deactivated" or "non-serving" beam pair links.

If a reporting setting is configured with measurement setting which is mapped to a resource setting, the UE may perform measurement to generate measurement results such as RSRP, RSRQ or CSI (or combination thereof) on the corresponding configured RS, and report the measurement results according to the reporting setting. There can be a signaling mechanism to activate/deactivate CSI/RSRP/RSRQ reporting. It may be referred to CSI/RSRP/RSRQ reporting as just 'CSI reporting' for brevity. When the reporting setting is activated, the UE reports the results according the detailed configuration in the reporting setting; when the reporting setting is deactivated, the UE does not report the results.

In one approach, the activation/deactivation of CSI reporting for certain measurement settings is determined by the beam indication signaling content of NR PDCCH. When the beam indication signaling indicates R beam pair links to be monitored by the UE, the CSI reporting setting that is linked to the RS resources/ports corresponding to the R beam pair links via a measurement setting is assumed to be activated. This procedure is illustrated in FIG. 28.

Figure 28:
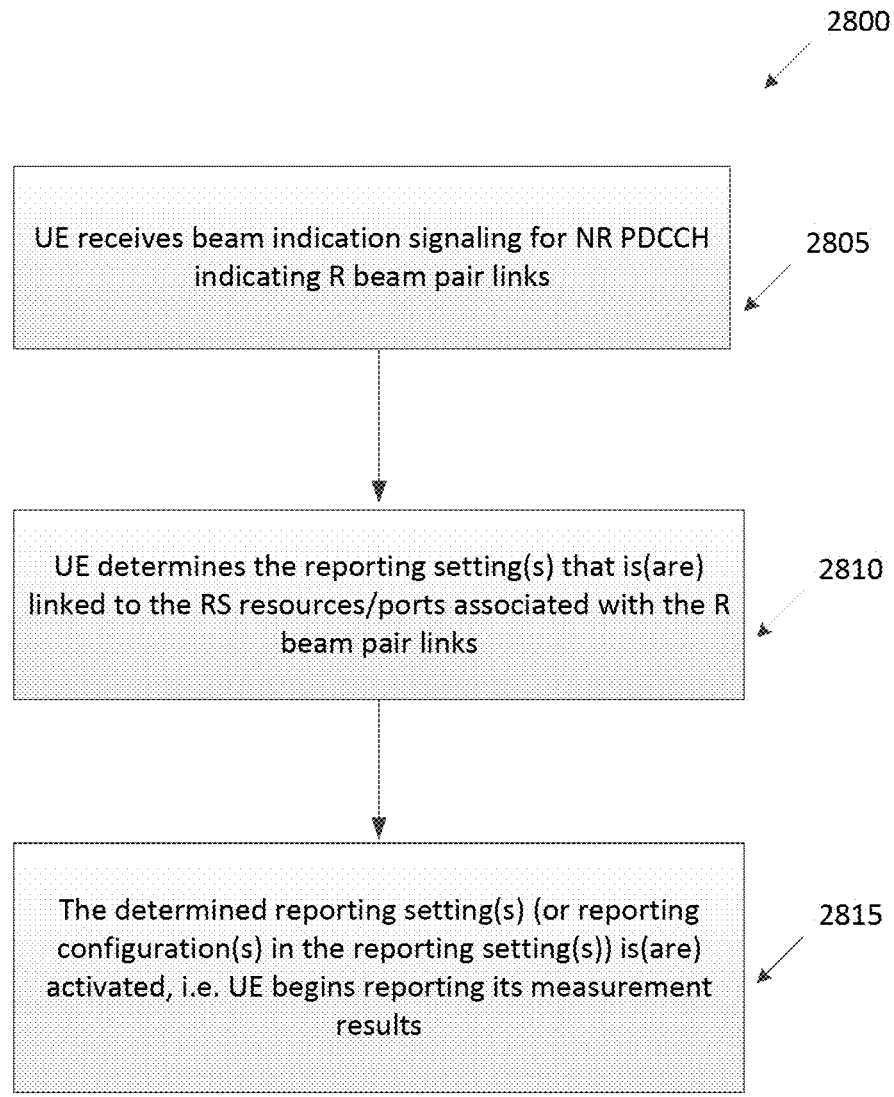
FIG. 28 illustrates an example reporting setting activation procedure according to embodiments of the present disclosure.

FIG. 28 illustrates an example reporting setting activation procedure 2800 according to embodiments of the present disclosure. An embodiment of the reporting setting activation procedure 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

Moreover, the beam indication signaling can also deactivate an active CSI reporting. In particular, from the R beam pair links indicated by the beam indication signaling, the UE determines the reporting setting(s) that is(are) linked to the RS resources/ports associated with the R beam pair links. This is referred to as set A. The UE also determines the reporting setting(s) that is(are) linked to the RS resources/ports NOT associated with the R beam pair links. This is referred to as set B. If the reporting setting(s) (or reporting configuration(s) in the reporting setting(s)) in set A is (are) in deactivation status, they are activated, i.e. the UE begins reporting the measurement results. If the reporting setting(s) (or reporting configuration(s) in the reporting setting(s)) in set A is(are) in activation status, they continue to be activated or are reactivated. If the reporting setting(s) (or reporting configuration(s) in the reporting setting(s)) in set B is(are) in activation status, they are deactivated, i.e. UE stops reporting the measurement results. This is illustrated in FIG. 29.

Figure 29:
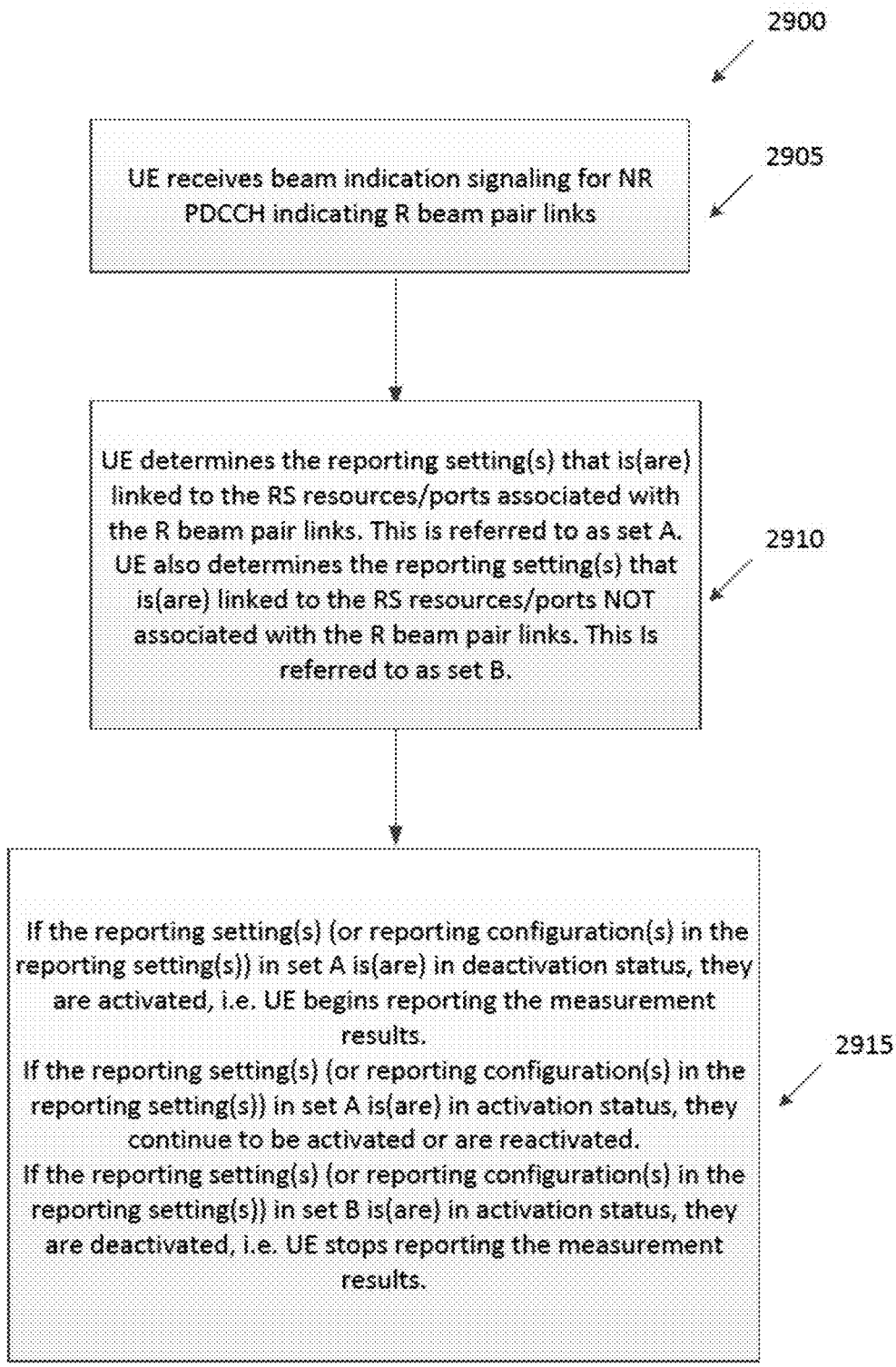
FIG. 29 illustrates an example reporting setting activation/deactivation procedure according to embodiments of the present disclosure.

FIG. 29 illustrates an example reporting setting activation/deactivation procedure 2900 according to embodiments of the present disclosure. An embodiment of the reporting setting activation/deactivation procedure 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

There is a need for a method to determine which reporting settings can be activated/deactivated by the beam indication signaling. In one embodiment, the reporting setting is linked to a cell-specific RS resource setting, and is configured with a semi-persistent reporting behavior. In another embodiment, more than one semi-persistent reporting procedure is defined, one of which is the semi-persistent reporting that is activated/deactivated by beam indication signaling. When a reporting setting is configured with semi-persistent reporting type which is activated/deactivated by beam indication signaling, the activation/deactivation by beam indication signaling is applicable.

In yet another embodiment, more than one activated/deactivated procedure of CSI reporting is defined, one of which is activation/deactivation by beam indication signaling. When a reporting setting is configured with activation/deactivation by beam indication signaling, the activation/deactivation by beam indication signaling is applicable.

Activation/deactivation of CQI reporting by beam indication signaling is beneficial since CQI calculation involves more complex UE processing and limiting the UE's calculation to beam pair links that are active for NR PDCCH monitoring reduces the need for UE processing. For RSRP/RSRQ reporting, the reporting may not be dependent on the beam indication signaling and this can be realized by not configuring activation/deactivation mechanism for reporting settings with RSRP/RSRQ reporting. Such configuration can also be implicit, i.e. RSRP/RSRQ reporting is assumed by the UE to not be associated with beam indication signaling.

However, there can also be scenarios where it can be beneficial for the network to obtain RSRP/RSRQ measurement results of the RS based on different time domain measurement or reporting procedures depending on the condition of the corresponding beam pair links. For example, assuming periodic measurement and reporting is configured, the reporting periodicity can be shorter for the active beam pair links, while the reporting periodicity can be longer for the inactive beam pair links, wherein the active or inactive beam pair links are indicated by the beam indication signaling. Other example of time domain behavior is measurement averaging behavior, such long term averaging or single time instance measurement (no averaging across slots/subframes). There can be different ways to realize this mechanism.

For example, multiple reporting settings are configured, each for different time-domain reporting behavior, then the same activation/deactivation methods and procedures for CSI reporting as described before can be applied to RSRP/RSRQ reporting. An exception is that there can a reporting setting that is "activated" when a beam pair link is "deactivated" by the beam indication signaling; in this case a signaling is needed to indicate to the UE what constitutes reporting "activation" by the beam indication signaling, e.g. 1 bit with 0 value to indicate reporting activation if the RS corresponding to a beam pair link is activated by the beam indication signaling, and value of 1 to indicate reporting activation if the RS corresponding to a beam pair link is deactivated by the beam indication signaling.

In another example, a reporting setting can be configured with multiple time domain measurement/reporting behavior. Linkage of the different time domain behavior to the "activation/deactivation" status of the beam pair link as indicated by the beam indication signaling can be explicitly configured in the reporting setting.

Although beam indication for NR PDCCH is used for describing the principles of the present disclosure, they can be extended to beam indication for other physical channels such as NR PDSCH.

The above embodiments described how certain configurations of reporting settings can be dependent on the beam indication signaling. Similar dependency can also be specified between the RS resource settings and the beam indication signaling. For example, there can be different RS resource settings with at least different time domain behavior and the beam indication signaling activates/deactivates certain time domain behavior.

Figure 30:
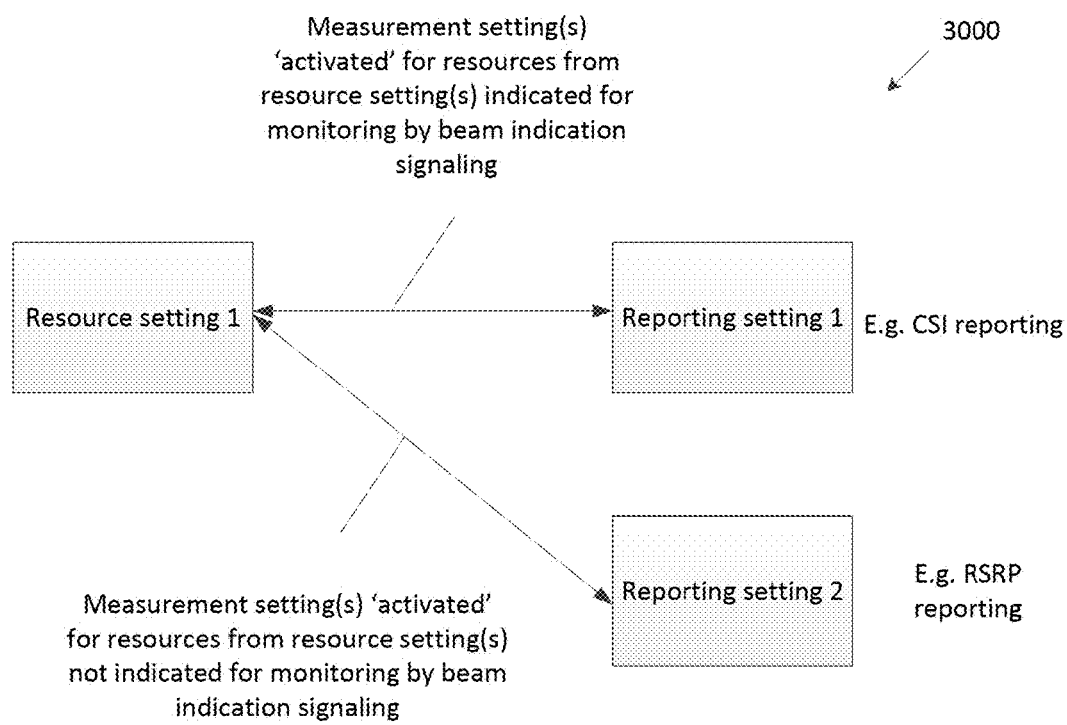
FIG. 30 illustrates an example measurement setting activation/deactivation procedure according to embodiments of the present disclosure.

In another embodiment, the "activation" or "deactivation" of UE reporting behavior is described as "activation" or "deactivation" of measurement setting as illustrated in FIG. 30.

FIG. 30 illustrates an example measurement setting activation/deactivation procedure 3000 according to embodiments of the present disclosure. An embodiment of the measurement setting activation/deactivation procedure 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

In another embodiment, the beam indication signaling for NR PDCCH explicitly indicates at least two types of beams or beam pair links. The first type is the 'serving' beam or beam pair link. The second type is the "non-serving" beam or beam pair link. A third type can be beam or beam pair link not belonging to the first or the second type. The UE may monitor the NR PDCCHs on the serving beam pair links, and the UE may perform measurement to generate measurement results such as RSRP, RSRQ or CSI on the RS associated with the serving and non-serving beam pair links (e.g. CSI-RS, NR SS). The UE does not perform measurement or monitoring on the third type.

Assuming three types of beam pair links, there is one bit in the beam indication signaling to indicate the type, along with the set of beam pair links (e.g. in the form of index or ID) belonging to the indicated type. For example, value 0 is used to indicate the first type, value 1 is used to indicate the second type, and the rest of beams or beam pair links not belonging to the first or the second type but belonging to the set of beam or beam pair links that can be associated with the NR PDCCH (can be configured by higher layer signaling, such as RRC) are considered the third type. In another example, more than one bit can be used to indicate the three (or more) types.

The same beam indication signaling (e.g. in a MAC CE) can contain the beam indications of all types. The same type indication can be included in measurement setting (or reporting setting according to some of the embodiments disclosed in the present disclosure), to create the activation/deactivation linkage. For example, assuming the beam indication signaling indicates that there are R1 beams of type 0, then measurement setting or reporting setting where type 0 is included in the configuration is "activated."

Figure 31:
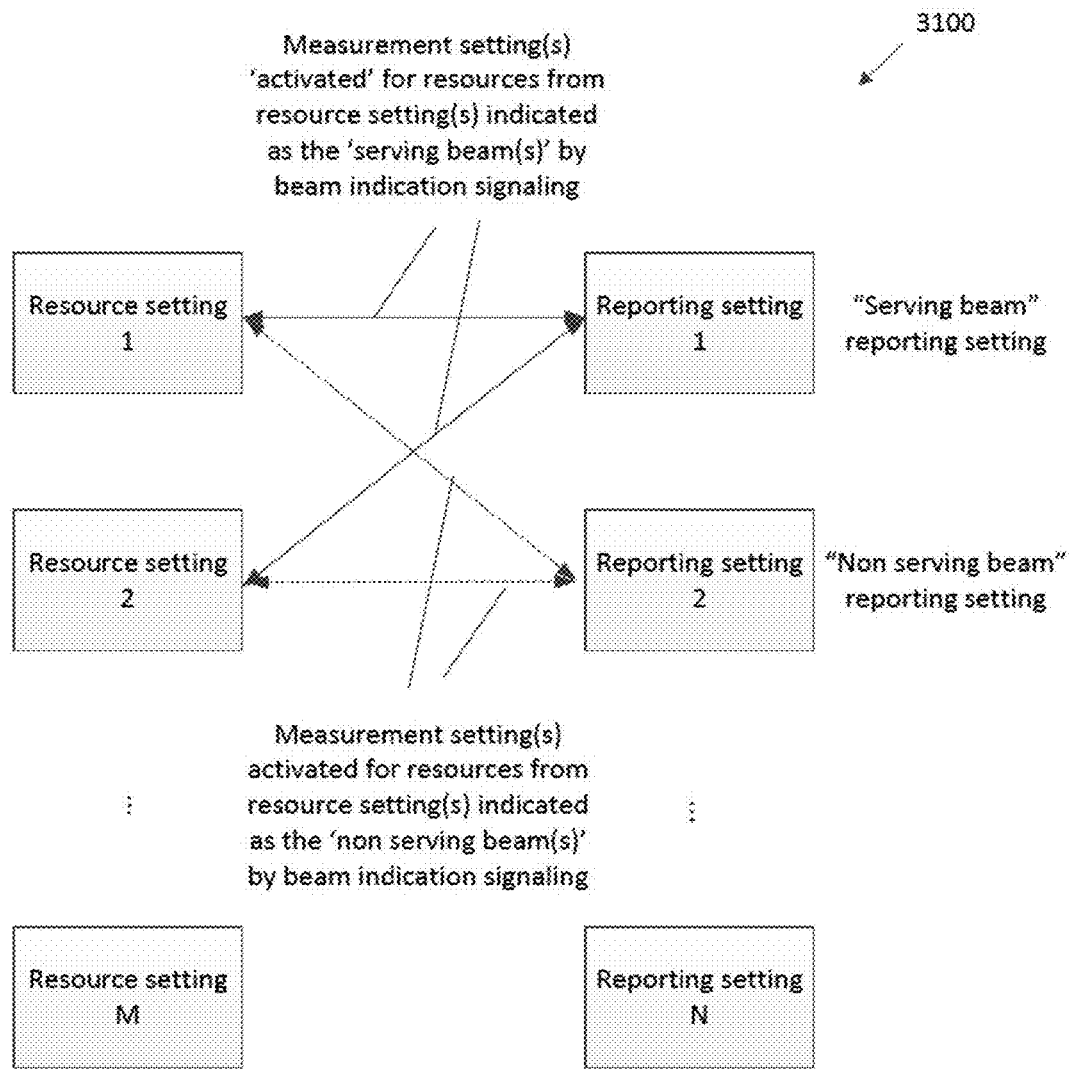
FIG. 31 illustrates an example measurement setting activation/deactivation procedure according to embodiments of the present disclosure.

FIG. 31 illustrates an example measurement setting activation/deactivation procedure 3100 according to embodiments of the present disclosure. An embodiment of the measurement setting activation/deactivation procedure 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for beam management in a wireless communication system, the UE comprising:
   a transceiver configured to receive, from a base station (BS), a radio resource control (RRC) signaling and a medium access control channel element (MAC CE) signaling including a beam indicator over a downlink channel for the beam management; and
   a processor configured to:
   identify the beam indicator based on the RRC signaling and the MAC CE signaling; and
   determine the beam indicator for a physical downlink control channel (PDCCH), a common physical downlink shared channel (PDSCH), and a fallback unicast PDSCH.

2. The UE of claim 1, wherein:
   the transceiver is further configure to receive, from the BS, the RRC signaling, the MAC CE signaling, and downlink control information (DCI) signaling over the downlink channel for the beam management, and
the processor is further configured to:
identify the beam indicator based on the RRC signaling, the MAC CE signaling, and the DCI signaling; and
determine the beam indicator for a non-fallback unicast PDSCH.

3. The UE of claim 1, wherein:
the processor is further configured to determine a beam management reference signal (RS) for a common PDSCH and common PDCCH based on a synchronization block (SS-block), and
the PDSCH includes at least one of random access responses (RARs), paging, or system information blocks (SIBs).

4. The UE of claim 1, wherein:
the transceiver is further configure to receive, from the BS, a beam management RS; and
the processor is further configured to determine a beam management RS for a fallback unicast PDSCH and a fallback unicast PDCCH based on at least one of an SS-block or a UE-specific persistent/semi-persistent channel state information-reference signal (P/SP CSI-RS); and the transceiver is further configured to transmit, to the BS, an uplink signal including a measurement result of the beam management RS.

5. The UE of claim 1, wherein:
the processor is further configured to identify a set of reference signal (RS) resources in the RRC signaling, and
the set of RS references includes at least one resource and port that are a quasi co-location (QCL) reference for receiving at least one of a data or control channel.

6. The UE of claim 5, wherein the set of RS references is down-selected by a MAC CE signaling transmitted by the BS.

7. The UE of claim 1, wherein:
the MAC CE signaling is used to indicate an identifier, and
the identifier indicates whether a beam management RS is activated or deactivated.

8. A base station (BS) for beam management in a wireless communication system, the BS comprising:
a processor configured to:
determine a beam indicator for a physical downlink control channel (PDCCH), a common physical downlink shared channel (PDSCH), and a fallback unicast PDSCH; and
configure the beam indicator based on a radio resource control (RRC) signaling and a medium access control channel element (MAC CE) signaling; and
a transceiver configured to transmit, to a user equipment (UE), the RRC signaling and the MAC CE signaling including the beam indicator over a downlink channel for the beam management.

9. The BS of claim 8, wherein:
the processor is further configured to:
determine the beam indicator for a non-fallback unicast PDSCH; and
configure the beam indicator based on the RRC signaling, the MAC CE signaling, and a downlink control information (DCI) signaling; and
the transceiver is further configure to transmit, to the UE, the RRC signaling, the MAC CE signaling, and the DCI signaling over the downlink channel for the beam management.

10. The BS of claim 8, wherein:
the processor is further configured to determine a beam management reference signal (RS) for a common PDSCH and common PDCCH based on a synchronization block (SS-block), and
the PDSCH includes at least one of random access responses (RARs), paging, or system information blocks (SIBs).

11. The BS of claim 8, wherein:
the processor is further configured to determine a beam management RS for a fallback unicast PDSCH and a fallback unicast PDCCH based on at least one of an SS-block or a UE-specific persistent/semi-persistent channel state information-reference signal (P/SP CSI-RS); and
the transceiver is further configured to:
transmit, to the UE, the beam management RS; and
receive, from the UE, an uplink signal including a measurement result of the beam management RS.

12. The BS of claim 8, wherein:
the processor is further configured to configure a set of reference signal (RS) resources in the RRC signaling, and
the set of RS references includes at least one resource and port that are a quasi co-location (QCL) reference for receiving at least one of a data or control channel.

13. The BS of claim 12, wherein the set of RS references is down-selected by a MAC CE signaling transmitted by the BS.

14. The BS of claim 8, wherein:
the MAC CE signaling is used to indicate an identifier, and
the identifier indicates whether a beam management RS is activated or deactivated.

15. A method of a user equipment (UE) for beam management in a wireless communication system, the method comprising:
receiving, from a base station (BS), a radio resource control (RRC) signaling and a medium access control channel element (MAC CE) signaling including a beam indicator over a downlink channel for the beam management;
identifying the beam indicator based on the RRC signaling and the MAC CE signaling; and
determining the beam indicator for a physical downlink control channel (PDCCH), a common physical downlink shared channel (PDSCH), and a fallback unicast PDSCH.

16. The method of claim 15, further comprising:
receiving, from the BS, the RRC signaling, the MAC CE signaling, and downlink control information (DCI) signaling over the downlink channel for the beam management;
identifying the beam indicator based on the RRC signaling, the MAC CE signaling, and the DCI signaling; and
determining the beam indicator for a non-fallback unicast PDSCH.

17. The method of claim 15, further comprising:
determining a beam management reference signal (RS) for a common PDSCH and common PDCCH based on a synchronization block (SS-block), wherein the PDSCH includes at least one of random access responses (RARs), paging, or system information blocks (SIBs).

18. The method of claim 15, further comprising:
receiving, from the BS, a beam management RS; and
determining a beam management RS for a fallback unicast PDSCH and a fallback unicast PDCCH based on at least one of an SS-block or a UE-specific persistent/semi-persistent channel state information-reference signal (P/SP CSI-RS); and
transmitting, to the BS, an uplink signal including a measurement result of the beam management RS.

19. The method of claim 15, further comprising:
identifying a set of reference signal (RS) resources in the RRC signaling, wherein the set of RS references includes at least one resource and port that are a quasi co-location (QCL) reference for receiving at least one of a data or control channel, and wherein the set of RS references is down-selected by a MAC CE signaling transmitted by the BS.

20. The method of claim 15, wherein the MAC CE signaling is used to indicate an identifier, and wherein the identifier indicates whether a beam management RS is activated or deactivated.

* * * * *